(12) United States Patent
Lisk, Jr. et al.

(10) Patent No.: US 12,715,186 B2
(45) Date of Patent: Aug. 25, 2026

(54) METHOD FOR MAKING EMBEDDED HYDROGEL CONTACT LENSES

(71) Applicant: Alcon Inc., Fribourg (CH)

(72) Inventors: James Reid Lisk, Jr., Buford, GA (US); Thae Hoon An, Duluth, GA (US); Daryl Reece, Atlanta, GA (US); Zahra Bassampour, Alpharetta, GA (US); Tudor Stanescu, Dacula, GA (US); Honghui Lu, Johns Creek, GA (US); Justin Joel Aguayo, Duluth, GA (US); Aaron Luke Leathley-Andrew, Gainesville, GA (US); Chandana Kolluru, Suwanee, GA (US)

(73) Assignee: Alcon Inc., Fribourg (CH)

( * ) Notice: Subject to any disclaimer, the term of this patent is extended or adjusted under 35 U.S.C. 154(b) by 230 days.

(21) Appl. No.: 18/611,772

(22) Filed: Mar. 21, 2024

(65) Prior Publication Data

US 2024/0316886 A1 Sep. 26, 2024

Related U.S. Application Data

(60) Provisional application No. 63/491,600, filed on Mar. 22, 2023.

(51) Int. Cl.
*B29D 11/00* (2006.01)
*B29L 11/00* (2006.01)
(Continued)

(52) U.S. Cl.
CPC .. *B29D 11/00038* (2013.01); *B29D 11/00048* (2013.01); *B29D 11/00134* (2013.01);
(Continued)

(58) Field of Classification Search
CPC ........ B29D 11/00038; B29D 11/00048; B29D 11/00134; B29D 11/0048;
(Continued)

(56) References Cited

U.S. PATENT DOCUMENTS 4,136,250 A 1/1979 Mueller et al.
4,153,641 A 5/1979 Deichert et al.
(Continued)

FOREIGN PATENT DOCUMENTS

EP 0632329 A1 1/1995

*Primary Examiner* — Jerzi H Moreno Hernandez
(74) *Attorney, Agent, or Firm* — Jian Zhou

(57) ABSTRACT

The invention is directed to a cast molding method for making embedded hydrogel contact lenses. The method comprises a step of actinically curing a lens-forming composition in specific locations in molding assemblies each of which is formed from one male lens mold half and one female insert mold half having a molded insert adhered thereon and comprises the lens-forming composition filling a gap between the back surface of the mold insert and the molding surface of the male lens mold half. This tack curing step ensures molded inserts adhered through multiple spots to the molding surface of each male lens mold halves which in turn will be used together with a female lens mold half in cast-molding of a lens forming composition to form an embedded silicone hydrogel contact lens.

15 Claims, 3 Drawing Sheets

(51) Int. Cl.

| | |
|---|---|
| ***C08J 3/24*** | (2006.01) |
| ***C09D 133/26*** | (2006.01) |
| ***G02B 1/04*** | (2006.01) |
| *G02C 7/04* | (2006.01) |

(52) U.S. Cl.
CPC ........... *B29D 11/0048* (2013.01); *C08J 3/243* (2013.01); *C09D 133/26* (2013.01); *B29L 2011/0041* (2013.01); *G02B 1/043* (2013.01); *G02C 7/04* (2013.01); *Y10S 425/808* (2013.01)

(58) Field of Classification Search
CPC ... B29L 2011/0041; G02B 1/043; G02C 7/04; Y10S 425/808; C08J 3/243; C09D 133/26
See application file for complete search history.

(56) References Cited

U.S. PATENT DOCUMENTS 4,182,822 A 1/1980 Chang
4,189,546 A 2/1980 Deichert et al.
4,254,248 A 3/1981 Friends et al.
4,259,467 A 3/1981 Keogh et al.
4,260,725 A 4/1981 Keogh et al.
4,261,875 A 4/1981 LeBoeuf
4,268,132 A 5/1981 Neefe
4,276,402 A 6/1981 Chromecek
4,327,203 A 4/1982 Deichert et al.
4,341,889 A 7/1982 Deichert et al.
4,343,927 A 8/1982 Chang
4,355,147 A 10/1982 Deichert et al.
4,401,371 A 8/1983 Neefe
4,444,711 A 4/1984 Schad
4,460,534 A 7/1984 Boehm et al.
4,486,577 A 12/1984 Mueller et al.
4,543,398 A 9/1985 Bany et al.
4,565,348 A 1/1986 Larsen
4,605,712 A 8/1986 Mueller et al.
4,661,575 A 4/1987 Tom
4,684,538 A 8/1987 Klemarczyk
4,703,097 A 10/1987 Wingler et al.
4,833,218 A 5/1989 Lee
4,837,289 A 6/1989 Mueller et al.
4,929,693 A 5/1990 Akashi
4,954,586 A 9/1990 Toyoshim et al.
4,954,587 A 9/1990 Mueller
5,010,141 A 4/1991 Mueller
5,034,461 A 7/1991 Lai et al.
5,039,761 A 8/1991 Ono et al.
5,070,170 A 12/1991 Robertson et al.
5,070,215 A 12/1991 Bambury et al.
5,079,319 A 1/1992 Mueller
5,098,546 A 3/1992 Kawashima et al.
5,156,726 A 10/1992 Nakada et al.
5,166,345 A 11/1992 Akashi et al.
5,346,946 A 9/1994 Yokoyama et al.
5,358,995 A 10/1994 Lai et al.
5,387,632 A 2/1995 Lai et al.
5,416,132 A 5/1995 Yokoyama et al.
5,449,729 A 9/1995 Lai
5,451,617 A 9/1995 Lai et al.
5,486,579 A 1/1996 Lai et al.
5,583,163 A 12/1996 Müller
5,665,840 A 9/1997 Pöhlmann et al.
5,712,356 A 1/1998 Bothe et al.
5,760,100 A 6/1998 Nicolson et al.
5,843,346 A 12/1998 Morrill
5,849,209 A 12/1998 Kindt-Larsen et al.
5,849,841 A 12/1998 Mühlebach et al.
5,894,002 A 4/1999 Boneberger et al.
5,962,548 A 10/1999 Vanderlaan et al.
5,981,675 A 11/1999 Valint, Jr. et al.
6,017,121 A 1/2000 Chateau et al.
6,019,914 A 2/2000 Lokshin et al.
6,039,913 A 3/2000 Hirt et al.
6,113,814 A 9/2000 Gemert et al.
6,149,841 A 11/2000 Kumar
6,165,408 A 12/2000 Steinmann
6,166,236 A 12/2000 Bambury et al.
6,221,303 B1 4/2001 Steinmann
6,296,785 B1 10/2001 Nelson et al.
6,303,687 B1 10/2001 Müller
6,348,604 B1 2/2002 Nelson et al.
6,472,489 B1 10/2002 Stockinger
6,479,587 B1 11/2002 Stockinger et al.
6,492,478 B1 12/2002 Steinmann
6,579,918 B1 * 6/2003 Auten .............. B29D 11/00048
351/159.33
6,762,264 B2 7/2004 Kunzler et al.
6,851,805 B2 2/2005 Blum et al.
6,867,245 B2 3/2005 Iwata et al.
6,995,192 B2 2/2006 Phelan et al.
7,104,648 B2 9/2006 Dahi et al.
7,214,809 B2 5/2007 Zanini et al.
7,423,074 B2 9/2008 Lai et al.
7,490,936 B2 2/2009 Blum et al.
7,556,750 B2 7/2009 Xiao et al.
7,584,630 B2 9/2009 Van Gemert
7,605,190 B2 10/2009 Moszner et al.
7,883,207 B2 2/2011 Iyer
7,931,832 B2 4/2011 Pugh et al.
7,977,430 B2 7/2011 Devlin et al.
7,999,989 B2 8/2011 Asai et al.
8,154,804 B2 4/2012 McGinn et al.
8,158,037 B2 4/2012 Chopra et al.
8,163,206 B2 4/2012 Chang
8,215,770 B2 7/2012 Blum et al.
8,318,144 B2 11/2012 Alcon
8,348,424 B2 1/2013 Pugh et al.
8,415,405 B2 4/2013 Maggio et al.
8,475,529 B2 7/2013 Clarke
8,480,227 B2 7/2013 Qiu et al.
8,529,057 B2 9/2013 Qiu et al.
8,614,261 B2 12/2013 Iwata et al.
8,658,748 B2 2/2014 Liu
8,697,770 B2 4/2014 Duis et al.
8,741,188 B2 6/2014 Chopra et al.
8,835,525 B2 9/2014 Kuyu et al.
8,874,182 B2 10/2014 Etzkorn et al.
8,922,898 B2 12/2014 Legerton et al.
8,993,651 B2 3/2015 Chang et al.
9,052,438 B2 6/2015 Xiao et al.
9,097,840 B2 8/2015 Chang
9,097,916 B2 8/2015 Chopra et al.
9,103,965 B2 8/2015 Chang
9,155,614 B2 10/2015 Blum et al.
9,176,332 B1 11/2015 Etzkorn et al.
9,187,601 B2 11/2015 Huang
9,217,813 B2 12/2015 Liu et al.
9,296,158 B2 3/2016 Pugh et al.
9,315,669 B2 4/2016 Holland
9,465,234 B2 10/2016 Chopra
9,475,827 B2 10/2016 Chang
9,581,832 B2 2/2017 Pugh et al.
9,618,773 B2 4/2017 Clarke
9,731,437 B2 8/2017 Pugh et al.
9,889,615 B2 2/2018 Pugh et al.
9,904,074 B2 2/2018 Duis
9,977,260 B2 5/2018 Pugh et al.
10,081,697 B2 9/2018 Huang
10,197,707 B2 2/2019 Xiao
10,203,521 B2 2/2019 Pugh et al.
10,209,534 B2 2/2019 Alli et al.
10,301,451 B2 5/2019 Jing
10,465,047 B2 11/2019 Jing
2004/0141150 A1 7/2004 Roffman et al.
2009/0091818 A1 4/2009 Haddock et al.
2010/0076553 A1 3/2010 Pugh et al.
2011/0157544 A1 6/2011 Pugh et al.
2012/0140167 A1 6/2012 Blum
2017/0307778 A1 * 10/2017 Tran ................. B29D 11/00048
2021/0291469 A1 * 9/2021 Zheng .............. B29D 11/00048
2022/0251302 A1 8/2022 Chang et al.

(56) References Cited

U.S. PATENT DOCUMENTS

| | | | |
|---|---|---|---|
| 2022/0305747 | A1 | 9/2022 | Breitkopf |
| 2022/0306810 | A1 | 9/2022 | Chang |
| 2022/0326412 | A1 | 10/2022 | Chang |

* cited by examiner

METHOD FOR MAKING EMBEDDED HYDROGEL CONTACT LENSES

This application claims the benefits under 35 USC § 119 (e) of U.S. provisional application No. 63/491,600, filed on 22 Mar. 2023, incorporated by reference in its entirety.

The present invention generally relates to a method for producing embedded hydrogel contact lenses. In addition, the present invention provides embedded hydrogel contact lenses produced according to a method of the invention.

BACKGROUND

Hydrogel contact lenses are widely used for correcting many different types of vision deficiencies due to their softness for wearing comfort. They are made of a hydrated, crosslinked polymeric material that contains from about 20% to about 75% by weight of water within the lens polymer matrix at equilibrium. Hydrogel contact lenses generally are produced according to the conventional full cast-molding process. Such a conventional manufacturing process comprises at least the following steps: lens molding (i.e., curing a polymerizable composition in molds), demolding (i.e., removing lenses from molds), extracting residual chemicals from the lenses with an extraction medium, hydrating lenses, packaging and sterilizing the hydrated lenses. During the lens hydration, the hydrogel contact lenses absorbs water and typically can swell significantly in size.

In recent years, incorporating various inserts in hydrogel contact lenses has been proposed for various purposes, e.g., for corneal health, vision correction, diagnosis, etc. See, for example, U.S. Pat. Nos. 4,268,132, 4,401,371, 5,098,546, 5,156,726, 6,851,805, 7,104,648, 7,490,936, 7,883,207, 7,931,832, 8,154,804, 8,215,770, 8,348,424, 8,874,182, 8,922,898, 9,155,614, 9,176,332, 9,296,158, 9,618,773, 9,731,437, 9,889,615, 9,977,260, 10,203,521, and 10,209,534; and U.S. Pat. Appl. Pub. Nos. 2004/0141150, 2009/0091818, 2010/0076553, 2011/0157544, and 2012/0140167.

An insert typically needs to be placed and fixed precisely in a specifically designed position in an embedded hydrogel contact lens. It is a great challenge to produce embedded hydrogel contact lenses that comprise one or more inserts embedded in specific positions in the embedded hydrogel contact lenses. A typical approach is to use molds having positioning guides (posts) provided on their molding surface for cast-molding embedded hydrogel contact lenses. Those positioning guides (posts) provides means for precisely positioning inserts in molds during cast-molding process. However, by using such molds with positioning guides (posts), small holes derived from those positioning guides (posts) are formed in resultant embedded hydrogel contact lenses. Those small holes in the embedded hydrogel lenses are susceptible to bioburden trapping, and are thus undesirable.

U.S. Pat. No. 9,581,832 discloses one approach for eliminating positioning guides (posts) in a method for making embedded hydrogel contact lenses. A method of U.S. Pat. No. 9,581,832 comprises the steps of: depositing an initial amount of a reactive monomer mixture into a front curve (FC) mold part; placing a rigid insert on the initial amount of the reactive monomer mixture; precuring the initial amount of the reactive monomer mixture to fixedly hold the rigid insert proximate to the front curve mold part to form a front curve assembly; depositing an additional amount of the reactive monomer mixture necessary for formation of the contact lens into the front curve assembly; placing a back curve mold part proximate to the front curve assembly; curing the initial and additional amounts of reactive monomer mixture to form the embedded contact lens. However, there are issues associated with this approach. For example, alignment of the insert with the FC mold is difficult and requires precision. Misalignment results in an off-center, off-height or tilted insert within the embedded contact lens. Further, the precuring step in combination with the curing step can lead to a cured material that can have potentially mechanical properties different from the rest lens bulk material and consequently can alter the shape of the final lens, as evidenced by the formation ridges and rings around the insert. In addition, hazy rings can be formed in the insert zone if curing intensities and times are too long.

Therefore, there is still a need for producing embedded hydrogel contact lenses (preferably embedded silicone hydrogel contact lenses) having inserts positioned accurately therein in a relatively efficient and consistent manner and which can be readily implemented in a production environment.

SUMMARY OF THE INVENTION

In one aspect, the invention provides a method for producing embedded hydrogel, comprising the steps of: (1) obtaining an female insert mold half having a first molding surface, an male insert mold half having a second molding surface, a female lens mold half having a third molding surface, and a male lens mold half having a fourth molding surface, wherein the first and second molding surfaces define respectively the front and back surfaces of a molded insert, wherein the third and fourth molding surfaces define respectively the anterior and posterior surfaces of a to be-molded contact lens, wherein the female and male insert mold halves are configured to receive each other such that an insert molding cavity is formed between the first and second molding surfaces when the female and male insert mold halves are closed securely, wherein the female and male lens mold halves are configured to receive each other such that a lens molding cavity is formed between the third and fourth molding surfaces when the female and male lens mold halves are closed securely, wherein the male lens mold and the female insert mold are configured to mate in a nested fashion with a close or interference fit; (2) dispensing an amount of an insert-forming composition on the first molding surface of the female insert mold half; (3) placing the male insert mold half on top of the insert-forming composition in the female insert mold half and closing the male and female insert mold halves to form a first molding assembly comprising the insert-forming composition therein; (4) curing the insert-forming composition in the first molding assembly to form the molded insert; (5) separating the first molding assembly obtained in step (4) into the male insert mold half and the female insert mold half with the molded insert adhered onto the first molding surface; (6) dosing a first amount of a lens-forming composition in the center of the back surface of the molded insert adhered on the first molding surface of the female insert mold half, wherein the first amount is sufficient to cover the back surface of the insert; (7) placing the male lens mold half on top of the lens-forming composition and closing the male lens mold half and the female insert mold half to form a second molding assembly in which the lens-forming composition is located in a gap between the back surface of the insert and the fourth molding surface of the male lens mold half; (8) actinically irradiating the lens-forming composition in specific locations in the second molding assembly so as to form one or more areas of adhesion of the molded insert to the fourth molding surface of the male lens mold half; (9) removing the female insert mold half, leaving the molded insert adhered onto the fourth molding surface of the male lens mold half; (10) dispensing a second amount of the lens-forming composition on the third molding surface of the female lens mold half; (11) placing the male lens mold half with the molded insert adhered thereon and obtained in step (9) on top of the female lens mold half and closing the male and female lens mold halves to form a third molding assembly comprising the lens-forming composition and the insert adhered onto the male lens mold half and suspended in the lens-forming composition; (12) actinically or thermally curing the lens-forming composition in the third molding assembly to form an embedded hydrogel contact lens precursor that comprises the molded insert embedded within a hydrogel material formed from the lens-forming composition; (13) separating the third molding assembly obtained in step (12) into the male and female lens mold halves, with the embedded hydrogel contact lens precursor adhered on one of the male and female lens mold halves; (14) removing the embedded hydrogel contact lens precursor from the lens-adhered mold half; and (15) subjecting the embedded hydrogel contact lens precursor to post-molding processes including a hydration process and one or more other processes selected from the group consisting of extraction, surface treatment, packaging, sterilization, and combinations thereof to form an embedded hydrogel contact lens.

In another aspect, the invention provides an embedded hydrogel contact lens obtained according to a method of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1A:
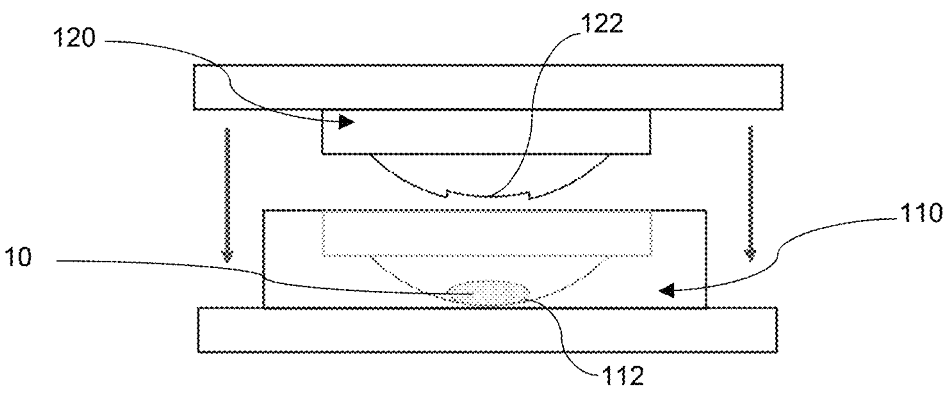
FIGS. 1A-1C (collectively, FIG. 1) schematically show a sequence of forming an insert: 1A showing the deposing of an insert-forming composition in the female insert mold half and closing of the male and female insert mold halves; 1B showing the molding assembly for forming an insert; and 1C showing the molded insert adhered on the female insert mold half after separating the male insert mold half from the female insert mold half.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"About" as used herein in this application means that a number, which is referred to as "about", comprises the recited number plus or minus 1-10% of that recited number.

"Contact Lens" refers to a structure that can be placed on or within a wearer's eye. A contact lens can correct, improve, or alter a user's eyesight or aesthetic appearance, but that need not be the case. A contact lens can be of any appropriate material known in the art or later developed, and can be a soft lens, a hard lens, or an embedded lens.

A "hydrogel contact lens" refers to a contact lens comprising a hydrogel bulk (core) material. A hydrogel bulk material can be a non-silicone hydrogel material or preferably a silicone hydrogel material.

A "hydrogel" or "hydrogel material" refers to a crosslinked polymeric material which has three-dimensional polymer networks (i.e., polymer matrix), is insoluble in water, but can hold at least 10% by weight of water in its polymer matrix when it is fully hydrated (or equilibrated).

A siloxane, which often also described as a silicone, refers to a molecule having at least one moiety of —Si—O—Si— where each Si atom carries two organic groups as substituents.

A "silicone hydrogel" or "SiHy" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" or "non-silicone hydrogel material" interchangeably refers to a hydrogel that is theoretically free of silicon.

A "male mold half" or "base curve mold half" interchangeably refers to a mold half having (1) a molding surface that is a substantially convex surface and that defines the posterior (back) surface of a contact lens (or an insert) and (2) a central axis that is the normal line at the center of the molding surface.

A "female mold half" or "front curve mold half" interchangeably refers to a mold half having (1) a molding surface that is a substantially concave surface and that defines the anterior (front) surface of a contact lens (or an insert) and (2) a central axis that is the normal line at the center of the molding surface.

The term "anterior surface", "front surface", "front curve surface" or "FC surface" in reference to a contact lens or an insert, as used in this application, interchangeably means a surface of the contact lens or insert that faces away from the eye during wear. The anterior surface (front surface) is typically substantially convex.

The "posterior surface", "back surface", "base curve surface" or "BC surface" in reference to a contact lens or insert, as used in this application, interchangeably means a surface of the contact lens or insert that faces towards the eye during wear. The posterior surface (back surface) is typically substantially concave.

An "embedded hydrogel contact lens" refers a hydrogel contact lens comprising at least one insert which is embedded within the bulk hydrogel material of the embedded hydrogel contact lens to an extend that at most one of the anterior or posterior surfaces of the insert can be exposed fully or partially. It is understood that the material of the insert is different from the bulk hydrogel material of the embedded hydrogel contact lens.

In this application, an "insert" refers to any preformed article which has a diameter of up to 13 mm, a front (anterior) surface, an opposite back (posterior) surface, a central axis, and a thickness less than any thickness of an embedded hydrogel contact lens in the region where the insert is embedded. It is understood that the insert must be smaller than the embedded hydrogel contact lens in dimension, so as to be embedded in the bulk material of the embedded hydrogel contact lens. The insert can be made of a polymeric material that can be a non-hydrogel material or a hydrogel material. Examples of preferred inserts include without limitation thin rigid inserts for providing rigid center optics for masking astigmatism like a rigid gas permeable (RGP) contact lens, multifocal lens inserts, photochromic inserts, cosmetic inserts having color patterns printed thereon, inserts with diffractive optical elements, etc.

In this application, a central axis of an insert (or contact lens) refers to an imaginary line passing through both the centers of the anterior (front) and posterior (back) surface of the insert (or contact lens).

In accordance with the invention, a non-hydrogel material can be any material that can absorb less than 5% (preferably about 4% or less, more preferably about 3% or less, even more preferably about 2% or less) by weight of water when being fully hydrated.

"Hydrophilic," as used herein, describes a material or portion thereof that will more readily associate with water than with lipids.

"Hydrophobic" in reference to an insert material or insert that has an equilibrium water content (i.e., water content in fully hydrated state) of less than 5% (preferably about 4% or less, more preferably about 3% or less, even more preferably about 2% or less).

The term "room temperature" refers to a temperature of about 22° C. to about 26° C.

The term "soluble", in reference to a compound or material in a solvent, means that the compound or material can be dissolved in the solvent to give a solution with a concentration of at least about 0.5% by weight at room temperature (i.e., a temperature of about 22° C. to about 26° C.).

The term "insoluble", in reference to a compound or material in a solvent, means that the compound or material can be dissolved in the solvent to give a solution with a concentration of less than 0.01% by weight at room temperature (as defined above).

A "vinylic monomer" refers to a compound that has one sole ethylenically unsaturated group, is soluble in a solvent, and can be polymerized actinically or thermally.

As used in this application, the term "ethylenically unsaturated group" is employed herein in a broad sense and is intended to encompass any groups containing at least one >C═$CH_2$ group. Exemplary ethylenically unsaturated groups include without limitation (meth)acryloyl

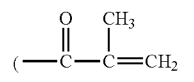

and/or

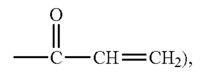

allyl, vinyl, styrenyl

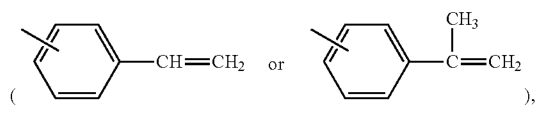

or other C═$CH_2$ containing groups.

An "acrylic monomer" refers to a vinylic monomer having one sole (meth)acryloyl group.

Examples of acrylic monomers includes (meth)acryloxy (or (meth)acryloyloxy) monomers and (meth)acrylamido monomers.

An "(meth)acryloxy monomer" or "(meth)acryloyloxy monomer" refers to a vinylic monomer having one sole group of

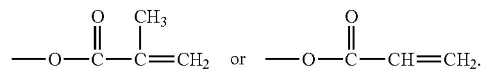

An "(meth)acrylamido monomer" refers to a vinylic monomer having one sole group of

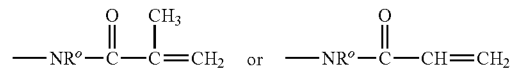

in which R° is H or $C_1$-$C_4$ alkyl.

The term "aryl acrylic monomer" refers to an acrylic monomer having at least one aromatic ring.

The term "(meth)acrylamide" refers to methacrylamide and/or acrylamide.

The term "(meth)acrylate" refers to methacrylate and/or acrylate.

An "N-vinyl amide monomer" refers to an amide compound having a vinyl group (—CH═$CH_2$) that is directly attached to the nitrogen atom of the amide group.

An "ene monomer" refers to a vinylic monomer having one sole ene group.

A "hydrophilic vinylic monomer", as used herein, respectively refers to a vinylic monomer which typically yields a homopolymer that is water-soluble or can absorb at least 10 percent by weight of water.

A "hydrophobic vinylic monomer", as used herein, respectively refers to a vinylic monomer, which typically yields a homopolymer that is insoluble in water and can absorb less than 10% by weight of water.

As used in this application, the term "vinylic crosslinker" refers to an organic compound having at least two ethylenically unsaturated groups. A "vinylic crosslinking agent" refers to a vinylic crosslinker having a molecular weight of 700 Daltons or less.

An "acrylic crosslinker" refers to a vinylic crosslinker having at least two (meth)acryloyl groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

As used in this application, the term "polymer" means a material formed by polymerizing/crosslinking one or more monomers or macromers or prepolymers or combinations thereof.

A "macromer" or "prepolymer" refers to a compound or polymer that contains ethylenically unsaturated groups and has a number average molecular weight of greater than 700 Daltons.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

A "polysiloxane segment" or "polydiorganosiloxane segment" interchangeably refers to a polymer chain segment (i.e., a divalent radical) of

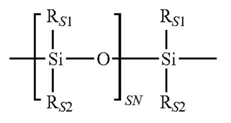

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-$(OC_2H_4)_{\gamma 1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R_{N1}'$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, or a linear hydrophilic polymer chain, in which $R_{N1}$ and $R_{N1}'$ independent of each other are hydrogen or a $C_1$-$C_5$ alkyl; and a photochromic organic radical having a photochromic group.

A "polysiloxane vinylic monomer" refers to a compound comprising at least one polysiloxane segment and one sole ethylenically-unsaturated group.

A "polydiorganosiloxane vinylic crosslinker" or polysiloxane vinylic crosslinker" interchangeably refers to a compound comprising at least one polysiloxane segment and at least two ethylenically-unsaturated groups.

The term "fluid" as used herein indicates that a material is capable of flowing like a liquid.

A free radical initiator can be either a photoinitiator or a thermal initiator. A "photoinitiator" refers to a chemical that initiates free radical crosslinking/polymerizing reaction by the use of light or similar electromagnetic radiation, ie. actinic irradiation. A "thermal initiator" refers to a chemical that initiates free radical crosslinking/polymerizing reaction by the use of heat energy.

In general, the invention is directed to a method for producing embedded hydrogel contact lenses having an insert embedded therein. This invention is partly based on the discovery that male lens mold halves and female insert mold halves can be designed to mate in a nested fashion with a close or interference fit. By using such designs of male lens mold halves and female insert halves, molding assemblies can be formed from female insert mold halves each having a molded insert adhered thereon and male lens mold halves. With such molding assemblies, one can ensure the centering of the insert. Within these molding assemblies, there is a small gap between the insert adhered on one female insert mold half and one male lens half for filling a lens-forming composition. It is also discovered that a lens-forming composition in the gap between the back surface of an insert and the molding surface of a male lens mold half can be tack-cured, namely, being cured only in specific actinically exposed locations to form spots of adhesion of the insert onto the male lens mold half. In those actinically shielded locations the lens-forming composition is not cured and remains to be a fluid that will later mix with and form a continuous phase with a lens-forming formulation used for forming the bulk hydrogel material of an embedded hydrogel contact lens.

The invention provides a method for producing embedded hydrogel contact lenses, comprising the steps of: (1) obtaining an female insert mold half having a first molding surface, an male insert mold half having a second molding surface, a female lens mold half having a third molding surface, and a male lens mold half having a fourth molding surface, wherein the first and second molding surfaces define respectively the front and back surfaces of a to-be-molded insert, wherein the third and fourth molding surfaces define respectively the anterior and posterior surfaces of a to be-molded contact lens, wherein the female and male insert mold halves are configured to receive each other such that an insert molding cavity is formed between the first and second molding surfaces when the female and male insert mold halves are closed securely, wherein the female and male lens mold halves are configured to receive each other such that a lens molding cavity is formed between the third and fourth molding surfaces when the female and male lens mold halves are closed securely, wherein the male lens mold and the female insert mold are configured to mate in a nested fashion with a close or interference fit; (2) dispensing an amount of an insert-forming composition on the first molding surface of the female insert mold half; (3) placing the male insert mold half on top of the insert-forming composition in the female insert mold half and closing the male and female insert mold halves to form a first molding assembly comprising the insert-forming composition therein; (4) curing the insert-forming composition in the first molding assembly to form the molded insert; (5) separating the first molding assembly obtained in step (4) into the male insert mold half and the female insert mold half with the molded insert adhered onto the first molding surface; (6) dosing a first amount of a lens-forming composition in the center of the back surface of the molded insert adhered on the first molding surface of the female insert mold half, wherein the first amount is sufficient to cover the back surface of the insert; (7) placing the male lens mold half on top of the lens-forming composition and closing the male lens mold half and the female insert mold half to form a second molding assembly in which the lens-forming composition is located in a gap between the back surface of the insert and the fourth molding surface of the male lens mold half; (8) actinically irradiating the lens-forming composition in specific locations in the second molding assembly so as to form one or more areas of adhesion of the molded insert to the fourth molding surface of the male lens mold half; (9) removing the female insert mold half, leaving the molded insert adhered onto the fourth molding surface of the male lens mold half; (10) dispensing a second amount of the lens-forming composition on the third molding surface of the female lens mold half; (11) placing the male lens mold half with the molded insert adhered thereon and obtained in step (9) on top of the female lens mold half and closing the male and female lens mold halves to form a third molding assembly comprising the lens-forming composition and the insert adhered onto the male lens mold half and suspended in the lens-forming composition; (12) actinically or thermally curing the lens-forming composition in the third molding assembly to form an embedded hydrogel contact lens precursor that comprises the molded insert embedded within a hydrogel material formed from the lens-forming composition; (13) separating the third molding assembly obtained in step (12) into the male and female lens mold halves, with the embedded hydrogel contact lens precursor adhered on one of the male and female lens mold halves; (14) removing the embedded hydrogel contact lens precursor from the lens-adhered mold half; and (15) subjecting the embedded hydrogel contact lens precursor to post-molding processes including a hydration process and one or more other processes selected from the group consisting of extraction, surface treatment, packaging, sterilization, and combinations thereof to form an embedded hydrogel contact lens.

Mold halves for making contact lenses (or inserts) are well known to a person skilled in the art and, for example, are employed in cast molding. In general, a molding assembly comprises at least two mold halves, one male half and one female mold half. The male mold half has a first molding (or optical) surface which is in direct contact with a polymerizable composition for cast molding of a contact lens (or an insert) and defines the posterior (back) surface of a molded contact lens (or a molded insert); and the female mold half has a second molding (or optical) surface which is in direct contact with the polymerizable composition and defines the anterior (front) surface of the molded contact lens (or molded insert). The male and female mold halves are configured to receive each other such that a lens- or insert-forming cavity is formed between the first molding surface and the second molding surface.

In accordance with the invention, the female insert mold half and the male lens mold half are designed to mate in a nested fashion with a close or interference fit.

In a preferred embodiment, the male insert mold half comprise an overflow groove which surrounds the second molding surface and receives any excess insert-forming material when the first molding assembly is closed. By having such an overflow groove, one can ensure that any flushes formed from the excess insert-forming material during molding of the insert can be stuck on the male insert mold half during the step of separating the first molding assembly, thereby removing the flushes.

In a preferred embodiment, the insert male mold (mold b) has a surface that is less strongly adhered to the cured insert material than to the female insert mold (mold a) to facilitate the insert adhering to the female insert mold (mold a) upon separation of the insert molding assembly. The difference in surface adhesion may be due to mold material composition (such as described in U.S. Pat. Nos. 4,565,348 and 5,849,209) or due to mold surface treatments (such as described in U.S. Pat. No. 5,894,002) or both.

Methods of manufacturing mold halves for cast-molding a contact lens or an insert are generally well known to those of ordinary skill in the art. The process of the present invention is not limited to any particular method of forming a mold half. In fact, any method of forming a mold half can be used in the present invention. The mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making mold halves can be used to make mold halves for making contact lenses or inserts. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used.

In accordance with the invention, an insert-forming composition and a lens-forming composition are polymerizable compositions that are different from each other. They can differ from each other in the presence or absence of one or more polymerizable components, in the amounts of one or more polymerizable components, and/or in the presence or absence of one or more non-leachable additives for providing different optical properties (e.g., photochromic dyes or pigments, UV-absorbing materials, HEVL-absorbing materials, fluorescent dyes or pigments, color-filtering materials for correcting color blindness, diffractive materials, high refractive-index materials, etc.).

In a preferred embodiment, the insert-forming composition is a polymerizable composition comprising at least one polymerizable photochromic compound (i.e., at least one photochromic vinylic monomer), at least UV-absorbing vinylic monomer, at least one HEVL-absorbing vinylic monomer, a fluorescent vinylic monomer, or combinations thereof.

In another preferred embodiment, the insert-forming composition is a polymerizable composition comprising at least one photochromic dye or pigment, at least one color-filtering material for correcting color blindness, a diffractive material, a high refractive-index material, or combinations.

In another preferred embodiment, the insert-forming composition is a polymerizable composition for forming a hydrophobic insert, including a rigid insert (more preferably a rigid gas-permeable insert), a soft insert (i.e., having an elastic modulus less than 2.0 MPa), or the like.

In another preferred embodiment, the insert-forming composition is a polymerizable composition for forming a hydrogel insert having an equilibrium water content of about 30% by weight or less.

In another preferred embodiment, the insert-forming composition is a polymerizable composition for forming an insert having an oxygen permeability of at least 40 barrers (preferably at least 50 barrers, more preferably at least 60 barrers, even more preferably from about 70 barrers to about 200 barrers) and a refractive index of at least 1.47, (preferably at least 1.49, more preferably at least 1.51, even more preferably at least 1.53) 30% by weight or less.

In accordance with the invention, the lens-forming composition is a hydrogel lens-forming composition, preferably a silicone hydrogel lens-forming composition.

Any polymerizable compositions can be used as insert-forming composition.

Preferably, a polymerizable composition for forming an insert comprises at least about 55% (preferably at least about 60%, more preferably at least about 65% even more preferably at least about 70%) by mole of one or more acrylic monomers and/or one or more acrylic crosslinker or crosslinking agent and at least about 6% by mole (preferably at least about 8% by mole, more preferably at least about 10% by mole, even more preferably at least about 12% by mole) of at least one vinylic crosslinking agent. It is understood that acrylic monomers and/or crosslinkers are required for providing H-bond acceptors (ester and/or amide bonds) to the crosslinked polymeric material of the hydrophobic insert of the embedded hydrogel contact lens.

Any hydrophobic acrylic monomers can be used in forming a rigid hydrophobic insert of the inventions. Examples of hydrophobic acrylic monomers includes silicone-containing acrylic monomers, non-silicone hydrophobic acrylic monomers, fluorine-containing acrylic monomers, aryl acrylic monomers as described below, and combinations thereof.

Examples of aryl acrylic monomers include, but are not limited to: 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)ethyl methacrylate; 2-(4-methylphenyl)ethyl acrylate; 2-(4-methylphenyl) ethyl methacrylate; 2-(4-propylphenyl)ethyl acrylate; 2-(4-propylphenyl)ethyl methacrylate; 2-(4-(1-methylethyl) phenyl)ethyl acrylate; 2-(4-(1-methylethyl)phenyl)ethyl methacrylate; 2-(4-methoxyphenyl)ethyl acrylate; 2-(4-methoxyphenyl)-ethyl methacrylate; 2-(4-cyclohexylphenyl)ethyl acrylate; 2-(4-cyclohexylphenyl)ethyl methacrylate; 2-(2-chlorophenyl)ethyl acrylate; 2-(2-chlorophenyl) ethyl methacrylate; 2-(3-chlorophenyl)ethyl acrylate; 2-(3-chlorophenyl)ethyl methacrylate; 2-(4-chlorophenyl)ethyl acrylate; 2-(4-chlorophenyl)ethyl methacrylate; 2-(4-bromophenyl)ethyl acrylate; 2-(4-bromophenyl)ethyl methacrylate; 2-(3-phenylphenyl)ethyl acrylate; 2-(3-phenylphenyl) ethyl methacrylate; 2-(4-phenylphenyl)ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy) ethoxy]ethyl methacrylate; or combinations thereof. More preferably, 2-phenylethyl acrylate; 3-phenylpropyl acrylate; 4-phenylbutyl acrylate; 5-phenylpentyl acrylate; 2-benzyloxyethyl acrylate; 3-benzyloxypropyl acrylate; 2-[2-(benzyloxy)ethoxy]ethyl acrylate; and their corresponding methacrylates are used in the invention.

It is also understood that any hydrophobic vinylic monomer can be used as a substitute for a hydrophobic acrylic monomer, so long as it comprises at least one H-bond acceptor such as ester bond, amide bond, carbonate bond, carbamate bond, ether bond, or combinations thereof. Examples of such hydrophobic monomers include vinyl alkanoates (any one of those described above in this application), vinyloxyalkanes (any one of those described above in this application), and combinations thereof.

It is understood that the mole percentages of each of the components of the crosslinked polymeric material of an insert of the invention can be obtained based on the mole percentages of its corresponding polymerizable component (material) in a polymerizable composition for making the insert.

In accordance with the invention, a polymerizable composition for forming an insert comprises at least one vinylic crosslinking agent. Any suitable vinyl crosslinking agents can be used in the invention. Examples of preferred vinylic crosslinking agents include without limitation: acrylic crosslinking agents (crosslinkers), allyl methacrylate, allyl acrylate, an aryl vinylic crosslinker (e.g., divinylbenzene, 2-methyl-1,4-divinylbenzene, bis(4-vinylphenyl) methane, 1,2-bis(4-vinylphenyl)ethane, etc.), triallyl isocyanurate, 2,4,6-triallyloxy-1,3,5-triazine, 1,2,4-trivinylcyclohexane, or combinations thereof. It is understood that vinylic crosslinking agents are required for imparting the desired rigidity to the crosslinked polymeric material of the rigid hydrophobic insert.

Examples of acrylic crosslinking agents include without limitation ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis(acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloyl-propane triacrylate, trimethyloylpropane trimethacrylate, tris(2-hydroxyethyl)isocyanurate triacrylate, tris(2-hydroxyethyl) isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloylpropane) tetramethacrylate, or combinations thereof.

In a preferred embodiment, the polymerizable composition for forming inserts comprises at least one acrylic crosslinking agent (any one of those described above).

In another preferred embodiment, the polymerizable composition for forming inserts comprises at least one aryl crosslinker (any one of those described above).

In another preferred embodiment, the polymerizable composition for forming inserts comprises at least one vinyl-functional polysiloxane that comprises at least two vinyl groups each directly attached to one silicon atom and at least 15% by mole of siloxane units each having at least one phenyl substituent.

Examples of such vinyl functional polysiloxanes include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), or combinations thereof. Preferably, the vinyl-functional polysiloxane is vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), or mixtures thereof.

In accordance with the invention, a polymerizable composition for forming an insert can further comprise at least one UV-absorbing vinylic monomer (any one of those described later in this application), at least one UV/HEVL-absorbing vinylic monomer (any one of those described later in this application, at least one photochromic vinylic monomer (any one of those described later in this application, or combinations thereof.

Where a polymerizable composition is for making an insert having an oxygen permeability of from about 40 barrers to 200 barrers and a refractive index of from about 1.47 to about 1.8, it comprises at least one aryl-containing polysiloxane vinylic crosslinker and optionally at least one components selected from the group consisting of a non-silicone aryl vinylic monomer, a silicone-containing aryl vinylic monomer, a non-silicone aryl vinylic crosslinker, and combinations thereof.

Preferred aryl-containing polysiloxane vinylic crosslinkers are those that each comprise: (1) a polydiorganosiloxane segment comprising dimethylsiloxane units and aryl-containing siloxane units each having at least one aryl-containing substituent having up to 45 carbon atoms; and (2) ethylenically-unsaturated groups (preferably (meth)acryloyl groups). In a preferred embodiment, the polydiorganosiloxane segment comprises at least 25% by mole of the aryl-containing siloxane units. The preferred aryl-containing polysiloxane vinylic crosslinkers can have a number average molecular weight of at least 1000 Daltons (preferably from 1500 Daltons to 100000 Daltons, more preferably from 2000 to 80000 Daltons, even more preferably from 2500 to 60000 Dalton).

Examples of such preferred aryl-containing polysiloxane vinylic crosslinkers include without limitation vinyl terminated polyphenylmethysiloxanes (e.g., PMV9925 from Gelest), vinylphenylmethyl terminated phenylmethyl-vinylphenylsiloxane copolymer (e.g., PVV-3522 from Gelest), vinyl terminated diphenylsiloxane-dimethylsiloxane copolymers (e.g., PDV-1625 from Gelest), (meth)acryloxyalkyl-terminated polyphenylmethysiloxanes, (meth)acryloxyalkyl-terminated phenylmethyl-vinylphenylsiloxane copolymers, (meth)acryloxyalkyl-terminated diphenylsiloxane-dimethylsiloxane copolymers, ethylenically-unsaturated group-terminated dimethylsiloxane-arylmethylsiloxane copolymers disclosed in U.S. Pat. Appl. Pub. No. 2022/00306810, or combinations thereof.

Examples of preferred non-silicone aryl vinylic monomers include those described above and aryl-containing ene monomers. Examples of preferred silicone-containing aryl vinylic monomers include without limitation p-vinylphenyltris(trimethylsiloxy)silane, m-vinylphenyltris(trimethylsiloxy)silane, o-vinylphenyltris(trimethylsiloxy)silane, p-styrylethyltris(trimethylsiloxy)silane, m-styrylethyl-tris (trimethylsiloxy)silane, o-styrylethyltris(trimethylsiloxy)silane). Examples of preferred non-silicone aryl vinylic crosslinkers include without limitation divinylbenzene, 2-methyl-1,4-divinylbenzene, bis(4-vinylphenyl) methane, 1,2-bis(4-vinylphenyl)ethane, and combinations thereof.

Examples of aryl-containing ene monomers include without limitation vinyl naphthalenes, vinyl anthracenes, vinyl phenanthrenes, vinyl pyrenes, vinyl biphenyls, vinyl terphenyls, vinyl phenyl naphthalenes, vinyl phenyl anthracenes, vinyl phenyl phenanthrenes, vinyl phenyl pyrenes, vinyl phenyl terphenyls, phenoxy styrenes, phenyl carbonyl styrenes, phenyl carboxy styrenes, phenoxy carbonyl styrenes, allyl naphthalenes, allyl anthracenes, allyl phenanthrenes, allyl pyrenes, allyl biphenyls, allyl terphenyls, allyl phenyl naphthalenes, allyl phenyl anthracenes, allyl phenyl phenanthrenes, allyl phenyl pyrenes, allyl phenyl terphenyls, allyl phenoxy benzenes, allyl(phenylcarbonyl)benzenes, allyl phenoxy benzenes, allyl(phenyl carbonyl)benzenes, allyl(phenylcarboxy)benzenes, and allyl(phenoxy carbonyl) benzenes.

Examples of preferred aryl-containing ene monomers include without limitation styrene, 2,5-dimethylstyrene, 2-(trifluoromethyl)styrene, 2-chlorostyrene, 3,4-dimethoxystyrene, 3-chlorostyrene, 3-bromostyrene, 3-vinylanisole, 3-methylstyrene, 4-bromostyrene, 4-tert-butylstyrene, 2,3,4,5,6-pentanfluorostyrene, 2,4-dimethylstyrene, 1-methoxy-4-vinylbenzene, 1-chloro-4-vinylbenzene, 1-methyl-4-vinylbenzene, 1-(chloromethyl)-4-vinylbenzene, 1-(bromomethyl)-4-vinylbenzene, 3-nitrostyrene, 1,2-vinyl phenyl benzene, 1,3-vinyl phenyl benzene, 1,4-vinyl phenyl benzene, 4-vinyl-1,1'-(4'-phenyl)biphenylene, 1-vinyl-4-(phenyloxy)-benzene, 1-vinyl-3-(phenyloxy)benzene, 1-vinyl-2-(phenyloxy)benzene, 1-vinyl-4-(phenyl-carbonyl) benzene, 1-vinyl-3-(phenylcarboxy)benzene, 1-vinyl-2-(phenoxycarbonyl)benzene, allyl phenyl ether, 2-biphenylylallyl ether, allyl 4-phenoxyphenyl ether, allyl 2,4,6-tribromophenyl ether, allyl phenyl carbonate, 1-allyloxy-2-trifluoromethylbenzene, allylbenzene, 1-phenyl-2-prop-2-enylbenzene, 4-phenyl-1-butene, 4-phenyl-1-butene-4-ol, 1-(4-methylphenyl)-3-buten-1-ol, 1-(4-chlorophenyl)-3-buten-1-ol, 4-allyltoluene, 1-allyl-4-fluorobenzene, 1-allyl-2-methyl-benzene, 1-allyl-3-methylbenzene, 1-allyl-3-methylbenzene, 2-allylanisole, 4-allylanisole, 1-allyl-4-(trifluromethyl)benzene, allylpentafluorobenzene, 1-allyl-2-methoxybenzene, 4-allyl-1,2-dimethoxybenzene, 2-allylphenol, 2-allyl-6-methylphenol, 4-allyl-2-methoxyphenol, 2-allyloxy-anisole, 4-allyl-2-methoxyphenyl acetate, 2-allyl-6-methoxyphenol, 1-allyl-2-bromobezene, alpha-vinylbenzyl alcohol, 1-phenyl-3-butene-1-one, allylbenzyl ether, (3-allyloxy)propyl)-benzene, allyl phenylethyl ether, 1-benzyloxy-4-pentene, (1-allyloxy)ethyl)benzene, 1-phenylallyl ethyl ether, (2-methyl-2-(2-propenyloxy)propyl)benzene, ((5-hexenyloxy)methyl)benzene, 1-allyloxy-4-propoxybenzene, 1-phenoxy-4-(3-prop-2-enoxypropoxy) benzene, 6-(4'-Hydroxy-phenoxy)-1-Hexene, 4-but-3-enoxyphenol, 1-allyloxy-4-butoxybenzene, 1-allyloxy-4-ethoxy-benzene, 1-allyl-4-benzyloxybenzene, 1-allyl-4-(phenoxy)benzene, 1-allyl-3-(phenoxy)benzene, 1-allyl-2-(phenoxy)benzene, 1-allyl-4-(phenyl carbonyl)benzene, 1-allyl-3-(phenyl carboxy)-benzene, 1-allyl-2-(phenoxycarbonyl)benzene, 1,2-allyl phenyl benzene, 1,3-allyl phenyl benzene, 1,4-allyl phenyl benzene, 4-vinyl-1,1'-(4'-phenyl) biphenylene, 1-allyl-4-(phenyloxy)-benzene, 1-allyl-3-(phenyloxy)benzene, 1-allyl-2-(phenyloxy)benzene, 1-allyl-4-(phenyl carbonyl)benzene, 1-allyl-3-(phenyl carboxy) benzene, and 1-allyl-2-(phenoxycarbonyl)benzene, 1-vinyl naphthylene, 2-vinyl naphthylene, 1-allyl naphthalene, 2-allyl naphthalene, allyl-2-naphthyl ether, 2-(2-methylprop-2-enyl)naphthalene, 2-prop-2-enylnaphthalene, 4-(2-naphthyl)-1-butene, 1-(3-butenyl)naphthalene, 1-allyl naphthalene, 2-allyl naphthalene, 1-allyl-4-napthyl naphthalene, 2-(allyloxy)-1-bromonaphthalene, 2-bromo-6-allyloxynaphthalene, 1,2-vinyl(1-naphthyl)benzene, 1,2-vinyl (2-naphthyl)benzene, 1,3-vinyl(1-naphthyl)benzene, 1,3-vinyl(2-naphthyl)benzene, 1,4-vinyl(1-naphthyl)benzene, 1,4-vinyl(2-naphthyl)benzene, 1-naphthyl-4-vinyl naphthalene, 1-allyl naphthalene, 2-allyl naphthalene, 1,2-allyl(1-naphthyl) benzene, 1,2-allyl(2-naphthyl)benzene, 1,3-allyl (1-naphthyl)benzene, 1,3-allyl(2-naphthyl)benzene, 1,4-allyl(1-naphthyl)benzene, 1,4-allyl(2-naphthyl)benzene, 1-allyl-4-napthyl naphthalene, 1-vinyl anthracene, 2-vinyl anthracene, 9-vinyl anthracene, 1-allyl anthracene, 2-allyl anthracene, 9-allyl anthracene, 9-pent-4-enylanthracene, 9-allyl-1,2,3,4-tetrachloroanthracene, 1-vinyl phenanthrene, 2-vinyl phenanthrene, 3-vinyl phenanthrene, 4-vinyl phenanthrene, 9-vinyl phenanthrene, 1-allyl phenanthrene, 2-allyl phenanthrene, 3-allyl phenanthrene, 4-allyl phenanthrene, 9-allyl phenanthrene, and combinations thereof.

A polymerizable composition for making hydrophobic inserts can be prepared by mixing all polymerizable materials as described above in the desired proportions, together with one or more polymerization initiators (thermal polymerization initiators or photoinitiators) in the presence or preferably in the absence of a non-reactive organic solvent (i.e., a non-reactive diluent) as described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butyl-cyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173@ and Darocur 2959@, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenyl-phosphine oxide; and bis-(2,6-dichlorobenzoyl)-4-N-butylphenylphosphine oxide. Reactive photoinitiators which can be incorporated, for example, into a macromer or can be used as a special monomer are also suitable, as disclosed in EP 632 329.

Lens-forming compositions (a.k.a., polymerizable compositions) are described in numerous patents and are well known to a person skilled in the art. There are generally two types of lens-forming compositions: the first for forming non-silicone hydrogel contact lenses (i.e., a non-silicone hydrogel bulk material in this application) and the other for forming silicone hydrogel contact lenses (i.e., a silicone hydrogel bulk material in this application).

Typically, a lens-forming composition for forming a non-silicone hydrogel bulk material is either (1) a monomer mixture comprising (a) at least one hydrophilic vinylic monomer (e.g., hydroxyl-containing vinylic monomer, N-vinyl amide monomer, (meth)acrylamido monomer, or combinations thereof), (b) a vinylic crosslinker, and (c) at least one component selected from the group consisting of a hydrophobic vinylic monomer, a free-radical initiator (photoinitiator or thermal initiator) (any one of those described above), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a vinylic crosslinker, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489.

Numerous lens-forming compositions for forming non-silicone hydrogel bulk materials (contact lenses) have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A. They can be used as a lens-forming composition of the invention.

Preferably, a lens-forming composition for forming a non-silicone hydrogel bulk material comprises at least 50% by mole of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth) acrylamide, N-2-hydroxypropyl (meth)acrylamide, N-2,3-dihydroxypropyl (meth)acrylamide, N-tris(hydroxymethyl) methyl (meth)acrylamide, vinyl alcohol, allyl alcohol, and combinations thereof, more preferably selected from the group consisting of hydroxyethyl (meth)acrylate, glycerol (meth)acrylate, hydroxyethyl (meth)acrylamide, and vinyl alcohol.

Numerous lens-forming compositions for forming silicone hydrogel contact lenses (bulk materials) have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A. They can be used as a lens-forming composition.

In accordance with the invention, a lens-forming composition for forming a silicone hydrogel bulk material comprises (1) at least one siloxane-containing (or silicone-containing) vinylic monomer and/or at least one polysiloxane vinylic crosslinker and (2) at least one hydrophilic vinylic monomer.

Examples of preferred silicone-containing vinylic monomers include without limitation vinylic monomers each having a bis(trialkylsilyloxy)alkylsilyl group (preferably a bis(trimethylsilyloxy)alkylsilyl group) or a tris(trialkylsilyloxy)silyl group (preferably a tris(trimethylsilyloxy)silyl group), polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Examples of preferred siloxane-containing vinylic monomers each having a bis(trialkylsilyloxy)alkylsilyl group or a tris(trialkylsilyloxy)silyl group include without limitation tris(trimethylsilyloxy)-silylpropyl (meth)acrylate, [3-(meth) acryloxy-2-hydroxypropyloxy]propyl-bis(trimethylsiloxy) methylsilane, [3-(meth)acryloxy-2-hydroxypropyloxy]propyl-bis(trimethylsiloxy)butylsilane, 3-(meth)acryloxy-2-(2-hydroxyethoxy)-propyloxy)-propylbis(trimethylsiloxy) methylsilane, 3-(meth)acryloxy-2-hydroxypropyloxy) propyl-tris(trimethylsiloxy)silane, N-[tris(trimethylsiloxy)-silylpropyl]-(meth)acrylamide, N-(2-hydroxy-3-(3-(bis (trimethylsilyloxy)methylsilyl)propyloxy)-propyl)-2-methyl (meth)acrylamide, N-(2-hydroxy-3-(3-(bis (trimethylsilyloxy)methylsilyl)-propyloxy)propyl) (meth) acrylamide, N-(2-hydroxy-3-(3-(tris(trimethylsilyloxy)silyl) propyloxy)-propyl)-2-methyl acrylamide, N-(2-hydroxy-3-(3-(tris(trimethylsilyloxy)silyl)propyloxy)propyl) (meth) acrylamide, N-[tris(dimethylpropylsiloxy)-silylpropyl]-(meth)acrylamide, N-[tris(dimethylphenylsiloxy) silylpropyl] (meth)acrylamide, N-[tris(dimethylethylsiloxy) silylpropyl] (meth)acrylamide, N,N-bis[2-hydroxy-3-(3-(bis (trimethyl-silyloxy)methylsilyl)propyloxy)propyl]-2-methyl (meth)acrylamide, N,N-bis[2-hydroxy-3-(3-(bis (trimethylsilyloxy)methylsilyl)propyloxy)-propyl] (meth) acrylamide, N,N-bis[2-hydroxy-3-(3-(tris (trimethylsilyloxy)silyl)propyloxy)propyl]-2-methyl (meth) acrylamide, N,N-bis[2-hydroxy-3-(3-(tris (trimethylsilyloxy)silyl)propyloxy)propyl] (meth) acrylamide, N-[2-hydroxy-3-(3-(t-butyl-dimethylsilyl) propyloxy)propyl]-2-methyl (meth)acrylamide, N-[2-hydroxy-3-(3-(t-butyldimethyl-silyl)propyloxy)propyl] (meth)acrylamide, N,N-bis[2-hydroxy-3-(3-(t-butyldimethylsilyl)propyloxy)-propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethyl-siloxy)silyl] propyl allyl carbamate, 3-[tris(trimethylsiloxy)silyl]propyl vinyl carbonate, those disclosed in U.S. Pat. Nos. 9,097,840, 9,103,965 and 9,475,827 (herein incorporated by references in their entireties), and mixtures thereof. The above preferred silicone-containing vinylic monomers can be obtained from commercial suppliers or can be prepared according to procedures described in U.S. Pat. Nos. 5,070,215, 6,166,236, 6,867,245, 7,214,809, 8,415,405, 8,475,529, 8,614,261, 8,658,748, 9,097,840, 9,103,965, 9,217,813, 9,315,669, and 9,475,827.

Examples of preferred polysiloxane vinylic monomers include without limitation mono-(meth)acryloyl-terminated, monoalkyl-terminated polysiloxanes of formula (1) include without limitation α-(meth)acryloxypropyl terminated ω-butyl (or ω-methyl) terminated polydimethylsiloxane, α-(meth)acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth)acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth) acryloxyisopropyloxy-2-hydroxypropyloxypropyl]-terminated ω-butyl (or ω-methyl) terminated polydimethylsiloxane, α-[3-(meth)acryloxybutyloxy-2-hydroxypropyloxypropyl]-terminated ω-butyl (or ω-methyl) terminated polydimethylsiloxane, α-[3-(meth)acryloxy-ethylamino-2-hydroxypropyloxypropyl]-terminated ω-butyl (or ω-methyl) terminated polydimethylsiloxane, α-[3-(meth)acryloxypropylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α[3-(meth)acryloxy(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylamino-propyl]-terminated ω-butyl (or ω-methyl) terminated polydimethylsiloxane, α-[(meth)acryloxy-2-hydroxypropyl-aminopropyl]-terminated ω-butyl (or ω-methyl) terminated polydimethylsiloxane, α-[(meth)acryloxy-2-hydroxypropyloxy-(polyethylenoxy)propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth)acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-

(meth)acrylamido-propyloxy-2-hydroxypropyloxypropyl]-terminated ω-butyl (or ω-methyl) terminated polydimethylsiloxane, α-[3-(meth)acrylamidoisopropyloxy-2-hydroxypropyloxypropyl]-terminated ω-butyl (or ω-methyl) terminated polydimethylsiloxane, α-[3-(meth)acrylamido-butyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl-(meth)acryloylamido]-2-hydroxypropyloxy-propyl]terminated ω-butyl (or ω-methyl) terminated polydimethylsiloxane, N-methyl-N'-(propyltetra(dimethylsiloxy)dimethylbutylsilane) (meth) acrylamide, N-(2,3-dihydroxypropane)-N'-(propyltetra(dimethylsiloxy)dimethylbutylsilane) (meth)acrylamide, (meth)acryloylamido-propyltetra(dimethylsiloxy)dimethylbutylsilane, mono-vinyl carbonate-terminated mono-alkyl-terminated polydimethylsiloxanes, mono-vinyl carbamate-terminated mono-alkyl-terminated polydimethylsiloxane, those disclosed in U.S. Pat. Nos. 9,097,840 and 9,103,965, and mixtures thereof. The above preferred polysiloxanes vinylic monomers can be obtained from commercial suppliers (e.g., Shin-Etsu, Gelest, etc.) or prepared according to procedures described in patents, e.g., U.S. Pat. Nos. 6,166,236, 6,867,245, 8,415,405, 8,475,529, 8,614,261, 9,217,813, and 9,315,669, or by reacting a hydroxyalkyl (meth)acrylate or (meth)acrylamide or a (meth)acryloxypolyethylene glycol with a mono-epoxypropyloxypropyl-terminated polydimethylsiloxane, by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane, or by reacting isocyanatoethyl (meth)acrylate with a mono-carbinol-terminated polydimethylsiloxane according to coupling reactions well known to a person skilled in the art.

Any suitable polysiloxane vinylic crosslinkers can be used in the invention. Examples of preferred polysiloxane vinylic crosslinkers include without limitation α,ω-(meth) acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate or (meth)acryloyl chloride with di-amino-terminated polydimethylsiloxanes or di-hydroxyl-terminated polydimethylsiloxanes; the reaction products of an azlactone-containing vinylic monomer (any one of those described above) with di-hydroxyl-terminated polydimethylsiloxanes; the reaction products of isocyantoethyl (meth)acrylate with di-hydroxyl-terminated polydimethylsiloxanes; the reaction products of isocyantoethyl (meth)acrylate with di-amino-terminated polydimethylsiloxanes; the reaction product of an amino-containing acrylic monomer with di-carboxyl-terminated polydimethylsiloxane in the presence of a coupling agent (a carbodiimide); the reaction product of a carboxyl-containing acrylic monomer with di-amino-terminated polydimethylsiloxane in the presence of a coupling agent (a carbodiimide); the reaction product of a hydroxyl-containing acrylic monomer with a di-hydroxy-terminated polydisiloxane in the presence of a diisocyanate or di-epoxy coupling agent; polysiloxane-containing macromer selected from the group consisting of Macromer A, Macromer B, Macromer C, and Macromer D described in U.S. Pat. No. 5,760,100; polysiloxane vinylic crosslinkers disclosed in U.S. Pat. Nos. 4,136,250, 4,153,641, 4,182,822, 4,189,546, 4,259,467, 4,260,725, 4,261,875, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,449,729, 5,451,617, 5,486,579, 5,962,548, 5,981,675, 6,039,913, 6,762,264, 7,423,074, 8,163,206, 8,480,227, 8,529,057, 8,835,525, 8,993,651, 9,187,601, 10,081,697, 10,301,451, and 10,465,047.

Examples of such preferred polysiloxane vinylic crosslinkers are α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxy-propyl]-terminated polydimethylsiloxane, α,ω-bis[3-(meth)acryloxybutyloxy-2-hydroxypropyloxypropyl]-terminated polydimethylsiloxane, α,ω-bis[3-(meth) acrylamidoethoxy-2-hydroxypropyloxy-propyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamido-isopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth) acryloxyethylamino-2-hydroxypropyloxypropyl]-terminated polydimethylsiloxane, α,ω-bis[3-(meth) acryloxypropylamino-2-hydroxypropyloxypropyl]-terminated polydimethyl-siloxane, α,ω-bis[3-(meth) acryloxybutylamino-2-hydroxypropyloxypropyl]-terminated polydimethylsiloxane, α,ω-bis[(meth) acrylamidoethylamino-2-hydroxypropyloxy-propyl]-terminated polydimethylsiloxane, α,ω-bis[3-(meth) acrylamidopropylamino-2-hydroxypropyloxy-propyl]-terminated polydimethylsiloxane, α,ω-bis[3-(meth) acrylamide-butylamino-2-hydroxy-propyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, and mixtures thereof.

Another class of preferred polysiloxane vinylic crosslinkers are chain-extended polysiloxane vinylic crosslinkers each of which comprises at least two polysiloxane segments and can be prepared according to the procedures described in U.S. Pat. Nos. 5,034,461, 5,416,132, 5,449,729, 5,760,100, 7,423,074, 8,529,057, 8,835,525, 8,993,651, 10,301,451, 10,465,047.

A further class of preferred polysiloxane vinylic crosslinkers are hydrophilized polysiloxane vinylic crosslinkers disclosed in U.S. patent Ser. No. 10/081,697 and U.S. Pat. Appl. Pub. No. 2022/0251302 A1.

Preferably, a lens forming composition for forming a silicone hydrogel bulk material comprises at least one polysiloxane vinylic crosslinker comprising hydrophilized siloxane units each having one methyl substituent and one organic radical including at least one H-bond donor (preferably hydroxyl groups).

Any hydrophilic vinylic monomers can be used in the invention. Examples of preferred hydrophilic vinylic monomers are alkyl (meth)acrylamides, hydroxyl-containing acrylic monomers, amino-containing acrylic monomers, carboxyl-containing acrylic monomers, N-vinyl amide monomers, methylene-containing pyrrolidone monomers (i.e., pyrrolidone derivatives each having a methylene group connected to the pyrrolidone ring at 3- or 5-position), acrylic monomers having a $C_1$-$C_4$ alkoxyethoxy group, vinyl ether monomers, allyl ether monomers, phosphorylcholine-containing vinylic monomers, N-2-hydroxyethyl vinyl carbamate, N-carboxyvinyl-p-alanine (VINAL), N-carboxyvinyl-α-alanine, and combinations thereof.

Examples of alkyl (meth)acrylamides include without limitation (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof.

Examples of hydroxyl-containing acrylic monomers include without limitation N-2-hydroxylethyl (meth)acrylamide, N,N-bis(hydroxyethyl) (meth)acrylamide, N-3-hydroxypropyl (meth)acrylamide, N-2-hydroxypropyl (meth) acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol) ethyl (meth)acrylamide having a number average molecular weight of up to 1500, and combinations thereof.

Examples of carboxyl-containing acrylic monomers include without limitation 2-(meth)acrylamidoglycolic acid, (meth)acrylic acid, ethylacrylic acid, 3-(emth)acrylamidopropionic acid, 5-(meth)acrylamidopentanoic acid, 4-(meth) acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof.

Examples of amino-containing acrylic monomers include without limitation N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth) acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth) acrylate, 3-amino-2-hydroxypropyl (meth)acrylate, trimethylammonium 2-hydroxy propyl (meth)acrylate hydrochloride, dimethylaminoethyl (meth)acrylate, and combinations thereof.

Examples of N-vinyl amide monomers include without limitation N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof.

Examples of methylene-containing pyrrolidone monomers include without limitation 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and mixtures thereof.

Examples of vinyl ether monomers include without limitation ethylene glycol monovinyl ether, di(ethylene glycol) monovinyl ether, tri(ethylene glycol) monovinyl ether, tetra (ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly (ethylene glycol) methyl vinyl ether, and combinations thereof.

Examples of allyl ether monomers include without limitation ethylene glycol monoallyl ether, di(ethylene glycol) monoallyl ether, tri(ethylene glycol) monoallyl ether, tetra (ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly (ethylene glycol) methyl allyl ether, and combinations thereof.

Examples of phosphorylcholine-containing vinylic monomers include without limitation (meth)acryloyloxyethyl phosphorylcholine, (meth)acryloyloxypropyl phosphorylcholine, 4-((meth)acryloyloxy)butyl-2'-(trimethylammonio) ethylphosphate, 2-[(meth)acryloylamino]ethyl-2'-(trimethylammonio)-ethylphosphate, 3-[(meth)acryloylamino] propyl-2'-(trimethylammonio)ethyl-phosphate, 4-[(meth) acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethyl-phosphate, 2-((meth)acryloyloxy) ethyl-2'-(tripropylammonio)ethylphosphate, 2-((rmeth) acryloyloxy)ethyl-2'-(tributylammonio)ethyl phosphate, 2-((meth)acryloyloxy)propyl-2'-(trimethylammonio)ethylphosphate, 2-((meth)acryloyloxy)butyl-2'-(trimethylammonio)-ethylphosphate, 2-((meth)acryloyloxy)pentyl-2'-(trimethylammonio)ethylphosphate, 2-((meth)acryloyloxy) hexyl-2'-(trimethylammonio)ethyl phosphate, 2-(vinyloxy) ethyl-2'-(trimethylammonio)ethylphosphate, 2-(allyloxy) ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethyl-phosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof.

In accordance with the invention, a lens-forming composition for forming a silicone hydrogel bulk material can also comprise one or more hydrophobic non-silicone vinylic monomers. Examples of preferred hydrophobic non-silicone vinylic monomers can be non-silicone hydrophobic acrylic monomers (methyl (meth)acrylate, ethyl (meth)acrylate, propyl (meth)acrylate, isopropyl (meth)acrylate, cyclohexyl (meth)acrylate, 2-ethylhexyl (meth)acrylate, isobornyl (meth)acrylate, (meth)acrylonitrile, etc.), fluorine-containing acrylic monomers (e.g., perfluorohexylethyl-thio-carbonyl-aminoethyl-methacrylate, perfluoro-substituted-$C_2$-$C_2$ alkyl (meth)acrylates described below, etc.), vinyl alkanoates (e.g., vinyl acetate, vinyl propionate, vinyl butyrate, vinyl valerate, etc.), vinyloxyalkanes (e.g., vinyl ethyl ether, propyl vinyl ether, n-butyl vinyl ether, isobutyl vinyl ether, cyclohexyl vinyl ether, t-butyl vinyl ether, etc.), styrene, vinyl toluene, vinyl chloride, vinylidene chloride, 1-butene, and combinations thereof.

Any suitable perfluoro-substituted-$C_2$-$C_{12}$ alkyl (meth) acrylates can be used in the invention. Examples of perfluoro-substituted-$C_2$-$C_{12}$ alkyl (meth)acrylates include without limitation 2,2,2-trifluoroethyl (meth)acrylate, tetrafluoropropyl (meth)acrylate, hexafluoro-iso-propyl (meth) acrylate, hexafluorobutyl (meth)acrylate, heptafluorobutyl (meth)acrylate, octafluoropentyl (meth)acrylate, heptadecafluorodecyl (meth)acrylate, pentafluorophenyl (meth) acrylate, and combinations thereof.

In accordance with the invention, a lens-forming composition for forming a silicone hydrogel bulk material can also comprise one or more non-silicone vinylic crosslinkers. Examples of preferred non-silicone vinylic crosslinkers are described later in this application.

In accordance with the invention, a lens-forming composition for forming a silicone hydrogel bulk material can also comprises other polymerizable materials, such as, a UV-absorbing vinylic monomer, a UV/high-energy-violet-light ("HEVL") absorbing vinylic monomer, polymerizable photochromic compound, a polymerizable tinting agent (polymerizable dye), or combinations thereof, as known to a person skilled in the art.

Any suitable UV-absorbing vinylic monomers and UV/HEVL-absorbing vinylic monomers can be used in a polymerizable composition for preparing a contact lens.

Examples of preferred photochromic vinylic monomers include polymerizable naphthopyrans, polymerizable benzopyrans, polymerizable indenonaphthopyrans, polymerizable phenanthropyrans, polymerizable spiro(benzindoline)-naphthopyrans, polymerizable spiro(indoline)benzopyrans, polymerizable spiro(indoline)-naphthopyrans, polymerizable spiro(indoline)quinopyrans, polymerizable spiro(indoline)-pyrans, polymerizable naphthoxazines, polymerizable spirobenzopyrans; polymerizable spirobenzopyrans, polymerizable spirobenzothiopyrans, polymerizable naphthacenediones, polymerizable spirooxazines, polymerizable spiro (indoline)naphthoxazines, polymerizable spiro(indoline)-pyridobenzoxazines, polymerizable spiro(benzindoline) pyridobenzoxazines, polymerizable spiro(benzindoline) naphthoxazines, polymerizable spiro(indoline)-benzoxazines, polymerizable diarylethenes, and combinations thereof, as disclosed in U.S. Pat. Nos. 4,929,693, 5,166,345 6,017,121, 7,556,750, 7,584,630, 7,999,989, 8,158,037, 8,697,770, 8,741,188, 9,052,438, 9,097,916, 9,465,234, 9,904,074, 10,197,707, 6,019,914, 6,113,814, 6,149,841, 6,296,785, and 6,348,604.

Lens-forming compositions of the invention can be prepared by dissolving or blending all of the desirable components (or materials) in any suitable non-reactive dilutent, so long as that the first lens-forming composition obtained is more viscous than the second lens-forming composition obtained.

A non-reactive diluent for preparing the first lens-forming composition can be any diluent having a high viscosity (e.g., greater than 20 cP at 20° C.). Preferred examples of such non-reactive diluents includes without limitation a poly($C_2$-$C_4$ alkyleneoxide) polymer, glycerol, propylene glycol, diethylene glycol, or mixtures thereof.

In accordance with the invention, a poly($C_2$-$C_4$ alkyleneoxide) polymer refers to a polymer of $T_1$-$(EO)_{m1}(PO)_{n1}(BO)_{p1}$-$T_2$ in which: $T_1$ and $T_2$ independent of each other is hydrogen, hydroxyl, $C_1$-$C_4$ alkoxy, or a $C_1$-$C_4$ alkyl; EO is a divalent radical of ethyleneoxide (—$CH_2$—$CH_2$—O—); PO is a divalent radical of propyleneoxide

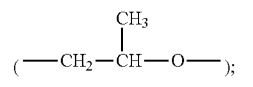

BO is a divalent radical of butyleneoxide

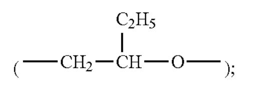

m1 is zero or an integer of from 5 to 65; n1 is zero or an integer of from 5 to 52; p1 is zero or integer of from 5 to 30; wherein if n1 is not zero, p1 is zero; wherein if p1 is not zero, n1 is zero and m1 is not zero; wherein (m1+n1+p1) is a value to provide the poly($C_2$-$C_4$ alkyleneoxide) polymer with a number average molecular weight of from about 300 to about 3000 Daltons (preferably from about 400 to about 2500 Daltons, more preferably from about 400 to about 2000 Daltons, even more preferably from about 400 to about 1500 Daltons).

Examples of preferred poly($C_2$-$C_4$ alkyleneoxide) polymers includes poly(ethyleneoxide) ("PEO"), poly(propyleneoxide) ("PPO"), poly(ethyleneoxide)-poly(propyleneoxide) di-block copolymer ("PEO-PPO"), poly (ethyleneoxide)-poly(propyleneoxide)-poly(ethyleneoxide) tri-block copolymer ("PEO-PPO-PEO"), poly(propyleneoxide)-poly(ethyleneoxide)-poly(propyleneoxide) tri-block copolymer ("PPO-PEO-PPO"), poly(ethyleneoxide)-poly (butyleneoxide) di-block copolymer ("PEO-PBO"), poly (ethyleneoxide)-poly(butyleneoxide)-poly(ethyleneoxide) tri-block copolymer ("PEO-PBO-PEO"), poly(butyleneoxide)-poly(ethyleneoxide)-poly(butyleneoxide) tri-block copolymer ("PBO-PEO-PBO"), and mixtures thereof. Those preferred poly($C_2$-$C_4$ alkyleneoxide) polymers, such as PEO, PPO, PEO-PPO, PEO-PPO-PEO and PPO-PEO-PPO, can be obtained from commercial sources or synthesized according to known methods. PEO-PBO, PEO-PBO-PEO and PBO-PEO-PBO can be synthesized according to procedures described in U.S. Pat. No. 8,318,144.

A non-reactive diluent for preparing the second lens-forming composition can be any diluent having a low viscosity, preferably less than 5 cP at 20° C. Examples of such non-reactive diluents include without limitation tetrahydrofuran, dipropylene glycol methyl ether, ethylene glycol n-butyl ether, ketones (e.g., acetone, methyl ethyl ketone, etc.), diethylene glycol n-butyl ether, diethylene glycol methyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, dipropylene glycol dimethyl ether, ethyl acetate, butyl acetate, amyl acetate, methyl lactate, ethyl lactate, propyl lactate, methylene chloride, 2-butanol, 1-propanol, 2-propanol, menthol, cyclohexanol, cyclopentanol, 2-pentanol, 3-pentanol, 2-hexanol, 3-hexanol, 3-methyl-2-butanol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3-methyl-3-hexanol, 2,4-dimethyl-2-pentanol, 1-methylcyclopentanol, 1-ethylcyclopentanol, 1-ethylcyclopentanol, 1-ethoxy-2-propanol, 1-methoxy-2-propanol, t-amyl alcohol, and mixtures thereof. More preferred organic solvents include without limitation 1-propanol, isopropanol, sec-butanol, tert-butyl alcohol, tert-amyl alcohol, methyl ethyl ketone, methyl isopropyl ketone, methyl propyl ketone, ethyl acetate, dipropylene glycol methyl ether, ethylene glycol n-butyl ether, diethylene glycol n-butyl ether, diethylene glycol methyl ether, propylene glycol methyl ether, propylene glycol methyl ether acetate, dipropylene glycol methyl ether acetate, propylene glycol n-propyl ether, dipropylene glycol n-propyl ether, propylene glycol n-butyl ether, dipropylene glycol n-butyl ether, dipropylene glycol dimethyl ether, and mixtures thereof.

The insert-forming composition and the lens-forming composition can be introduced into the insert-molding cavity and the lens-molding cavity respectively according to any techniques known to a person skilled in the art.

When the first molding assembly is closed, any excess insert-forming composition is pressed into an overflow groove provided on the male insert mold half (i.e., the first male mold half having a second molding surface defining the posterior surface of an insert to be molded).

The curing of the insert-forming composition within the insert-molding cavity of the closed first molding assembly and the lens-forming composition within the lens-molding cavity of the closed third molding assembly can be carried out thermally (i.e., by heating) or actinically (i.e., by actinic radiation, e.g., UV radiation and/or visible radiation) to activate the polymerization initiators.

The actinic polymerization of the insert- or lens-forming composition in a molding assembly can be carried out by irradiating the closed molding assembly with the insert- or lens-forming composition therein with an UV or visible light, according to any techniques known to a person skilled in the art.

The thermal polymerization of the insert- or lens-forming composition in a molding assembly can be carried out conveniently in an oven at a temperature of from 25 to 120° C. and preferably 40 to 100° C., as well known to a person skilled in the art. The reaction time may vary within wide limits, but is conveniently, for example, from 1 to 24 hours or preferably from 2 to 12 hours. It is advantageous to previously degas the silicone-hydrogel-lens-forming composition and to carry out said copolymerization reaction under an inert atmosphere, e.g., under $N_2$ or Ar atmosphere.

The step of separating the first molding assembly can be carried out according to any techniques known to a person skilled in the art. Many techniques are known in the art. For example, the first molding surface of the female insert mold half can be surface-treated to render the molded insert preferentially adhered to the first molding surface of this mold half. Alternatively, a compression force can be applied by using a mold-opening device to non-optical surface (opposite to the molding surface) of the male insert mold half (not adhering the molded insert) of the first molding assembly at a location about the center area of non-optical molding surface at an angle of less than 30 degrees, preferably less than 10 degrees, more preferably less than 5 degrees (i.e., in a direction substantially normal to center area of non-optical molding surface) relative to the axis of the mold to deform the male insert male mold half, thereby breaking bonds between the molding surface of the male insert mold half and the molded insert.

It is understood that the mold-opening device can have any configurations known to a person skilled in the art for performing the function of separating two mold halves from each other.

Similarly, the step of separating the second or third molding assembly can be carried out according to any techniques known to a person skilled in the art.

In accordance with the invention, the step of (8) actinically irradiating the lens-forming composition in specific locations in the second molding assembly so as to form spots of adhesion of the molded insert to the fourth molding surface of the male lens mold half can be carried out by using a mask with holes as known to a person skilled in the art. The holes of the mask will allow irradiation passing to create the actinically exposed locations in the gap so as to form spots of adhesion between the molded insert to the fourth molding surface of the male lens mold half.

After the embedded hydrogel lens precursor is delensed, it typically is extracted with an extraction medium as well known to a person skilled in the art. The extraction liquid medium is any solvent capable of dissolving the diluent(s), unpolymerized polymerizable materials, and oligomers in the embedded silicone hydrogel lens precursor. Water, any organic solvents known to a person skilled in the art, or a mixture thereof can be used in the invention.

Preferably, the organic solvents used extraction liquid medium are water, a buffered saline, a $C_1$-$C_3$ alkyl alcohol, 1,2-propylene glycol, a polyethyleneglycol having a number average molecular weight of about 400 Daltons or less, a $C_1$-$C_6$ alkylalcohol, or combinations thereof. The extracted embedded hydrogel contact lens can then be hydrated according to any method known to a person skilled in the art.

The hydrated embedded hydrogel contact lens can further subject to further processes, such as, for example, surface treatment, packaging in lens packages with a packaging solution which is well known to a person skilled in the art; sterilization such as autoclave at from 118 to 124° C. for at least about 30 minutes; and the like.

Lens packages (or containers) are well known to a person skilled in the art for autoclaving and storing a soft contact lens. Any lens packages can be used in the invention.

Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Chemicals

The following abbreviations are used in the following examples: TrisMA represents 3-[Tris(trimethylsiloxy)silyl] propyl methacrylate; Tris-Sty represents 4-[Tris(trimethylsiloxy)silyl]styrene; DMS-R11 represents methacryloxypropyl-terminated polydimethylsiloxane (Mw~1000 Da); DMA represents N,N-dimethyl acrylamide; VAZO 67 represents 2,2'-azobis(2-methylbutyronitrile); DVB represents divinyl benzene; RB247 is Reactive Blue 247; PPG425 represents poly(propylene glycol) (Mn-425; from Sigma-Aldrich); PBS represents a phosphate-buffered saline which has a pH of 7.2±0.2 at 25° C. and contains about 0.044 wt. % $NaH_2PO_4 \cdot H_2O$, about 0.388 wt. % $Na_2HPO_4 \cdot 2H_2O$, and about 0.79 wt. % NaCl and; wt. % represents weight percent; "$H_4$" macromer represents a di-methacryloyloxypropyl-terminated polysiloxane (Mn~11.3K-12.3K g/mol, OH content~1.82-2.01 meq/g) of formula (A) shown below.

(A)

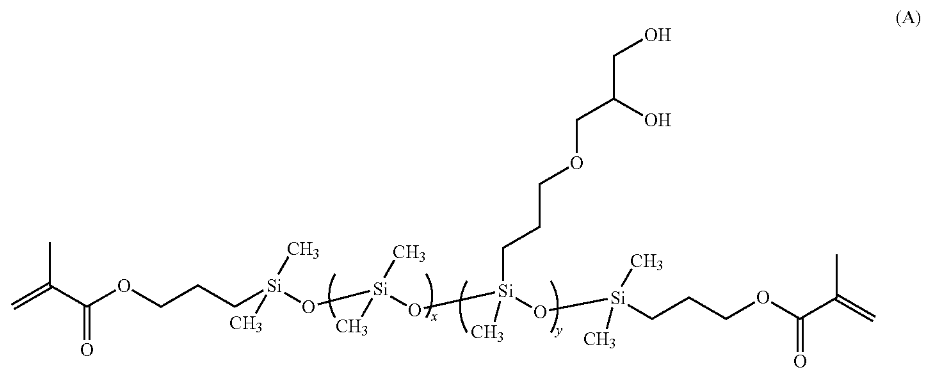

Example 1

Insert-Forming Composition

An insert-forming compositions (i.e., Insert formulations) for making rigid hydrophobic inserts are prepared at room temperature in air by blending all the components (materials) as following: 20 weight part units of DMS-R11; 70 weight part units of Tris-Sty; 10 weight part units of DVB; 0.01 weight part units of RB247; and 0.5 weight part units of Vazo-67.

Lens-Forming Compositions

A lens-forming composition (i.e., SiHy lens formulation) is prepared at room temperature in air by blending all the components (materials) in their desired amounts (weight parts units) to have the following composition: 32 weight part units of $H_4$; 21 weight part units of TrisMA; 24 weight part units of DMA; 22 weight part units of PPG425; and 1 weight part units of Darocur 1173.

Preparation of Embedded Silicone Hydrogel Contact Lenses

Embedded SiHy contact lenses are prepared as illustrated in FIGS. 1A-1C, FIGS. 2A-2D and FIGS. 3*a*-3C and as described below.

Figure 1B:
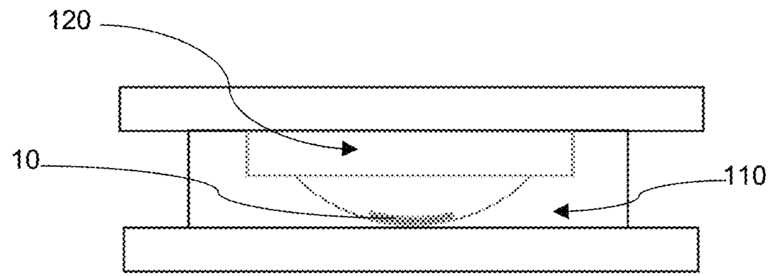

An insert-forming composition prepared above is purged with nitrogen at room temperature for 30 to 35 minutes. An amount of the $N_2$-purged insert-forming composition is disposed on the molding surface 112 of a female insert mold half 110 that is made of polypropylene and has a molding surface 112 which defines the front surface of an insert (FIG. 1A). The female insert mold half 110 with the insert-forming composition 10 therein is closed with a male insert mold half 120, which is made of polypropylene and has a molding surface 122 defining the back surface of the insert, to form the first molding assembly (FIG. 1B). The oven is configured as follows: a nitrogen supply is connected to the oven through a flow controller which can control the flow rate of nitrogen through the oven; an air supply is also connected through a flow control which can control the flow rate of air through the oven, at the exhaust line of the oven, an exhaust fan is connected to control the differential pressure of the oven.

The insert-forming compositions in the first molding assemblies are thermally cured in the oven under the following conditions: purge the oven with nitrogen to reduce the oxygen concentration to about 100 ppm, ramp from room temperature to 55° C. at a ramp rate of about 7° C./minute; holding at 55° C. for about 30-40 minutes; ramp from 55° C. to 80° C. at a ramp rate of about 7° C./minute; holding at 55° C. for about 30-40 minutes; ramp from 80° C. to 100° C. at a ramp rate of about 7° C./minute; and holding at 100° C. for about 30-40 minutes, cool the oven at a rate of about 5° C./minute to about 40° C., purge the oven with air to increase the oxygen content to about 20 volume percent, then remove the first molding assemblies from the oven.

Figure 1C:
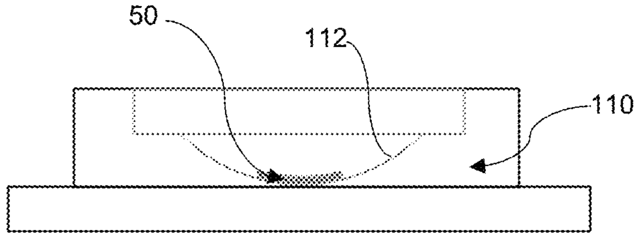

The first molding assemblies are opened and the molded inserts 50 typically adhere to the molding surface 112 of the female insert mold halves 110 (FIG. 1C). Parts in which the molded insert is adhered to the molding surface of the female insert mold halves are selected for continued processing.

Figure 2A:
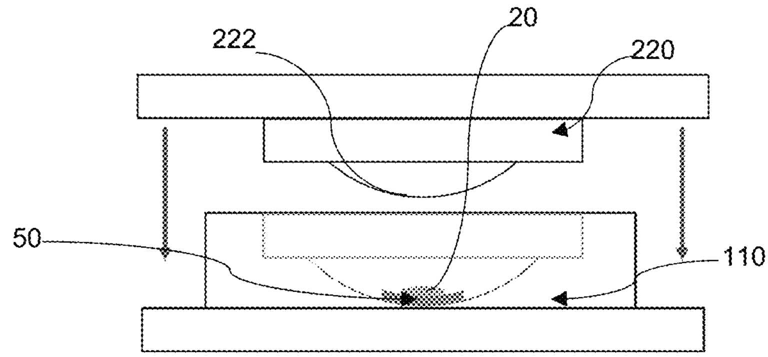
FIGS. 2A-2D (collectively, FIG. 2) schematically show a sequence of forming an insert: 2A showing the deposing of a lens-forming composition on the back surface of the molded insert adhered on the female insert mold half and closing of the male lens mold half and the female insert mold half; 2B showing the molding assembly for limited spatial curing; 2C showing the limited spatial curing of the lens-forming composition in the molding assembly; and 2D showing the molded insert adhered on the male lens mold half after separating the female insert mold half from the male lens mold half.
Figure 2B:
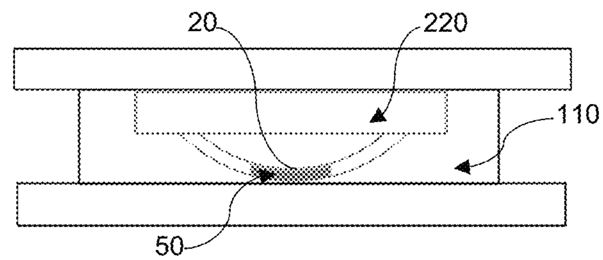
Figure 2C:
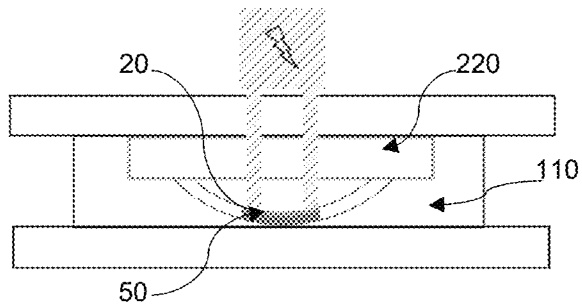

The lens-forming composition prepared above is purged with nitrogen at room temperature for 30 to 35 minutes. A first amount (e.g., 2-10 mg) of the $N_2$-purged lens-forming composition 20 is disposed onto the molded insert adhered onto the molding surface of the female insert mold half 110 (FIG. 2A). The female insert mold half 110 with the adhered insert 50 and with the lens-forming composition 20 therein is closed with a male lens mold half 220 which is made of polypropylene, to form a second molding assembly (FIG. 2B). The male lens mold half 220 has a molding surface 222 defining the posterior surface of a contact lens to be molded. The male lens mold half 220 and the female insert mold half 110 are designed to mate in a nested fashion with a close or interference fit.

Figure 2D:
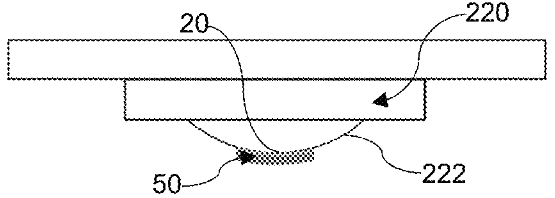

The closed $2^{nd}$ molding assemblies are tack-cured (FIG. 2C), i.e., being irradiated with UV/visible light (Hamamatsu lamp) at an intensity of about 5 $mW/cm^2$ for about 40 to 60 seconds through a mask with pores for limiting the actinic curing of the lens-forming composition in specific actinically-exposed locations so as to form one or more areas of adhesion between the insert to the fourth molding surface of the male lens mold half. The irradiation source, intensity and exposure time are selected to cause the composition to react and gel at the locations of exposure. The areas of adhesion are outside the optical zone of the lens, leaving one or more channels of uncured formulation communicating between the optic zone at the male mold (mold d) surface, and the volume beyond the edge of the insert. No significant quantity of cured lens forming composition occupies space between the insert and the female insert mold (mold a), thus there is relatively little adhesive force between the insert and the female insert mold (mold a). The $2^{nd}$ molding assemblies are mechanically opened. The insert is adhered to the molding surface of the male lens mold half 220. The insert 50 is maintained a controlled distance from the molding surface of the male lens mold half (mold d) by the thickness of the gelled areas of formulation 20 (FIG. 2D). An amount of uncured (liquid) lens forming composition is held within the gap between the insert and the male mold 220 surface, in the areas around the cured formulation.

Figure 3A:
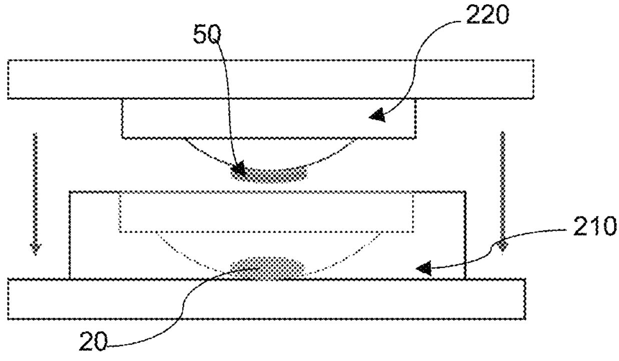
FIGS. 3A-3C (collectively, FIG. 3) schematically show a sequence of forming an insert: 3A showing the deposing of a lens-forming composition in the female lens mold half and closing of the male lens model half with the molded insert adhered thereon with the female lens mold half; 3B showing the molding assembly for forming an embedded contact lens; and 3C showing the molded embedded contact lens with an insert embedded therein after demolding and delensing.
Figure 3B:
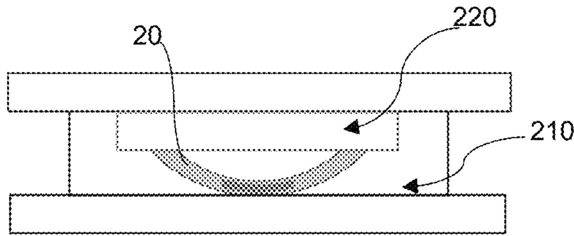
Figure 3C:
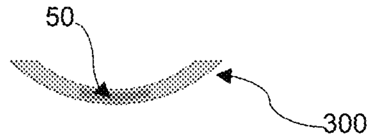

A second amount (e.g., 25-40 mg) of the $N_2$-purged lens-forming composition 20 is disposed onto the molding surface of the female lens mold half 210 (FIG. 3A). The female lens mold half 210 with the lens-forming composition, is closed with the male lens mold half 220 includes the adhered insert 50. The female lens mold half has a molding surface 222 defining the anterior surface of a contact lens to be molded. Air bubble formation in the optical zone is blocked by the uncured lens-forming-composition held between the insert and male mold.

The closed third molding assemblies (FIG. 3B), each with an insert suspended within the lens-forming composition 20 inside the molding cavities, are actinically cured by UV/visible light (such as a Hamamatsu lamp) at an intensity of about 5 $mW/cm^2$ for about 40 to 60 seconds. The irradiation source, intensity and exposure time are selected to cause the composition to react and gel. The third molding assemblies are mechanically opened. Mold opening typically includes a pre-treatment step whereby the mold is deformed to initiate lens separation from the female mold so that the lens will adhere to the male mold. A lens precursor 300 (i.e., a molded silicone hydrogel contact lens with insert therein) is delensed by application of ultrasonic energy to the male lens mold.

The delensed embedded silicone hydrogel contact lens precursors can be extracted with a mixture of 50:50 of propylene glycol:water or other extraction media appropriate for the silicon hydrogel chemistry. Preferably, the delensed embedded silicone hydrogel contact lens precursors are subjected to the following extraction/hydration, coating, autoclave processes.

The embedded silicone hydrogel contact lenses are soaked in a bath containing deionized water or an aqueous solution of Tween 80 (500 PPM), for about 60 minutes, then in a bath containing an aqueous solution of polyacrylic acid (PAA, Mw 450K) at a concentration of ca. 0.1% by weight at 40° C. for about 120 minutes; then in a bath containing a PBS solution at room temperature for about 60 minutes; packed/sealed in polypropylene lens packaging shells (or blisters) (one lens per shell) with 0.65 mL of an in-package-coating saline which is prepared according to the procedure described in Example 19 of U.S. Pat. No. 8,480,227; and finally autoclaved for about 45 minutes at about 121° C. The resultant embedded SiHy contact lenses each have a hydrogel coating thereon.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing embedded hydrogel contact lenses, comprising the steps of:
   - (1) obtaining an female insert mold half having a first molding surface, an male insert mold half having a second molding surface, a female lens mold half having a third molding surface, and a male lens mold half having a fourth molding surface, wherein the first and second molding surfaces defines respectively the front and back surfaces of a to-be-molded insert, wherein the third and fourth molding surfaces defines respectively the anterior and posterior surfaces of a to be-molded contact lens, wherein the female and male insert mold halves are configured to receive each other such that an insert molding cavity is formed between the first and second molding surfaces when the female and male insert mold halves are closed securely, wherein the female and male lens mold halves are configured to receive each other such that a lens molding cavity is formed between the third and fourth molding surfaces when the female and male lens mold halves are closed securely, wherein the male lens mold and the female insert mold are configured to mate in a nested fashion with a close or interference fit;
   - (2) dispensing an amount of an insert-forming composition on the first molding surface of the female insert mold half;
   - (3) placing the male insert mold half on top of the insert-forming composition in the female insert mold half and closing the male and female insert mold halves to form a first molding assembly comprising the insert-forming composition therein;
   - (4) curing the insert-forming composition in the first molding assembly to form the molded insert;
   - (5) separating the first molding assembly obtained in step (4) into the male insert mold half and the female insert mold half with the molded insert adhered onto the first molding surface;

(6) dosing a first amount of a lens-forming composition in the center of the back surface of the molded insert adhered on the first molding surface of the female insert mold half, wherein the first amount is sufficient to cover the back surface of the insert;

(7) placing the male lens mold half on top of the lens-forming composition and closing the male lens mold half and the female insert mold half to form a second molding assembly in which the lens-forming composition is located in a gap between the back surface of the insert and the fourth molding surface of the male lens mold half;

(8) actinically irradiating the lens-forming composition in specific locations in the second molding assembly so as to form spots of adhesion of the molded insert to the fourth molding surface of the male lens mold half;

(9) removing the female insert mold half, leaving the molded insert adhered onto the fourth molding surface of the male lens mold half;

(10) dispensing a second amount of the lens-forming composition on the third molding surface of the female lens mold half;

(11) placing the male lens mold half with the molded insert adhered thereon and obtained in step (9) on top of the female lens mold half and closing the male and female lens mold halves to form a third molding assembly comprising the lens-forming composition and the insert adhered onto the male lens mold half and suspended in the lens-forming composition;

(12) actinically curing the lens-forming composition in the third molding assembly to form an embedded hydrogel contact lens precursor that comprises the molded insert embedded within a hydrogel material formed from the lens-forming composition;

(13) separating the third molding assembly obtained in step (12) into the male and female lens mold halves, with the embedded hydrogel contact lens precursor adhered on one of the male and female lens mold halves;

(14) removing the embedded hydrogel contact lens precursor from the lens-adhered mold half; and

(15) subjecting the embedded hydrogel contact lens precursor to post-molding processes including a hydration process and one or more other processes selected from the group consisting of extraction, surface treatment, packaging, sterilization, and combinations thereof to form an embedded hydrogel contact lens.

2. The method of embodiment 1, wherein the step of (4) curing the insert-forming composition is carried out photochemically by using UV and/or visible light.

3. The method of embodiment 1, wherein the step of (4) curing the insert-forming composition is carried out thermally by heating the first molding assembly in an oven at one or more curing temperatures selected from about 40° C. to about 100° C.

4. The method of any one of embodiments 1 to 3, wherein the embedded hydrogel contact lens precursor is from the lens-adhered mold half before the embedded hydrogel contact lens precursor is contact with water or any liquid.

5. The method of any one of embodiments 1 to 4, wherein the male insert mold half comprises an overflow groove which surrounds the second molding surface and into which any excess insert-forming material is pressed when the first molding assembly is closed securely, wherein any flushes formed from the excess insert-forming material during step (4) can be stuck on the male insert mold half during step of separating the first molding assembly halves, thereby removing the flushes.

6. The method of any one of embodiments 1 to 5, wherein the step (8) is carried out by using a mask with holes that allows actinic irradiation passing through to generate the actinically exposed locations in the gap, thereby forming spots of adhesion between the molded insert to the fourth molding surface of the male lens mold half.

7. The method of embodiment 6, wherein the holes are arranged in a rotationally symmetric manner.

8. The method of any one of embodiments 1 to 7, wherein the insert-forming composition is a polymerizable composition comprising at least one polymerizable photochromic compound (i.e., at least one photochromic vinylic monomer), at least UV-absorbing vinylic monomer, at least one HEVL-absorbing vinylic monomer, a fluorescent vinylic monomer, or combinations thereof.

9. The method of any one of embodiments 1 to 7, wherein the insert-forming composition is a polymerizable composition comprising at least one photochromic dye or pigment, at least one color-filtering material for correcting color blindness, a diffractive material, a high refractive-index material, or combinations.

10. The method of any one of embodiments 1 to 7, wherein the insert-forming composition is a polymerizable composition for forming a hydrophobic insert, preferably a hydrophobic rigid insert, even more preferably a rigid gas-permeable insert.

11. The method of any one of embodiments 1 to 7, wherein the insert-forming composition is a polymerizable composition that comprises at least about 55% (preferably at least about 60%, more preferably at least about 65% even more preferably at least about 70%) by mole of one or more acrylic monomers and/or one or more acrylic crosslinker or crosslinking agent and at least about 6% by mole (preferably at least about 8% by mole, more preferably at least about 10% by mole, even more preferably at least about 12% by mole) of at least one vinylic crosslinking agent.

12. The method of embodiment 11, wherein the one or more acrylic monomers are 2-ethylphenoxy acrylate; 2-ethylphenoxy methacrylate; phenyl acrylate; phenyl methacrylate; benzyl acrylate; benzyl methacrylate; 2-phenylethyl acrylate; 2-phenylethyl methacrylate; 3-phenylpropyl acrylate; 3-phenylpropyl methacrylate; 4-phenylbutyl acrylate; 4-phenylbutyl methacrylate; 4-methylphenyl acrylate; 4-methylphenyl methacrylate; 4-methylbenzyl acrylate; 4-methylbenzyl methacrylate; 2-(2-methylphenyl)ethyl acrylate; 2-(2-methylphenyl)ethyl methacrylate; 2-(3-methylphenyl)ethyl acrylate; 2-(3-methylphenyl)-ethyl methacrylate; 2-(4-methylphenyl)ethyl acrylate; 2-(4-methylphenyl)ethyl methacrylate; 2-(4-propylphenyl)ethyl acrylate; 2-(4-propylphenyl)ethyl methacrylate; 2-(4-(1-methylethyl)phenyl)ethyl acrylate; 2-(4-(1-methylethyl)phenyl)ethyl methacrylate; 2-(4-methoxyphenyl)ethyl acrylate; 2-(4-methoxyphenyl)-ethyl methacrylate; 2-(4-cyclohexyl-phenyl)ethyl acrylate; 2-(4-cyclohexylphenyl)ethyl methacrylate; 2-(2-chlorophenyl)ethyl acrylate; 2-(2-chlorophenyl)ethyl methacrylate; 2-(3-chlorophenyl)ethyl acrylate; 2-(3-chlorophenyl)ethyl methacrylate; 2-(4-chlorophenyl)ethyl acrylate; 2-(4- chlorophenyl)ethyl methacrylate; 2-(4-bromophenyl) ethyl acrylate; 2-(4-bromophenyl)ethyl methacrylate; 2-(3-phenylphenyl)ethyl acrylate; 2-(3-phenylphenyl) ethyl methacrylate; 2-(4-phenylphenyl)-ethyl acrylate; 2-(4-phenylphenyl)ethyl methacrylate; 2-(4-benzylphenyl)ethyl acrylate; 2-(4-benzylphenyl)ethyl methacrylate; 2-(phenylthio)ethyl acrylate; 2-(phenylthio)ethyl methacrylate; 2-benzyloxyethyl acrylate; 3-benzyloxypropyl acrylate; 2-benzyloxyethyl methacrylate; 3-benzyloxypropyl methacrylate; 2-[2-(benzyloxy)ethoxy]ethyl acrylate; 2-[2-(benzyloxy)ethoxy] ethyl methacrylate; or combinations thereof, wherein said at least one vinylic crosslinking agent is ethylene glycol dimethacrylate; ethylene glycol diacrylate; 1,3-propanediol diacrylate; 1,3-propanediol dimethacrylate; 2,3-propanediol diacrylate; 2,3-propanediol dimethacrylate; 1,4-butanediol dimethacrylate; 1,4-butanediol diacrylate; 1,5-pentanediol dimethacrylate; 1,5-pentanediol diacrylate; 1,6-hexanediol dimethacrylate; 1,6-hexanediol diacrylate; diethylene glycol dimethacrylate; diethylene glycol diacrylate; triethylene glycol dimethacrylate; triethylene glycol diacrylate; tetraethylene glycol dimethacrylate; tetraethylene glycol diacrylate; N,N'-methylene bis(acrylamide); N,N'-methylene bis(methacrylamide); N,N'-ethylene bis (acrylamide); N,N'-ethylene bis(methacrylamide); N,N'-hexamethylene bisacrylamide; N,N'-hexamethylene bismethacrylamide; pentaerythritol triacrylate, pentaerythritol trimethacrylate, trimethyloyl-propane triacrylate, trimethyloylpropane trimethacrylate, tris(2-hydroxyethyl)isocyanurate triacrylate, tris(2-hydroxyethyl)isocyanurate trimethacrylate, 1,3,5-triacryloxylhexahydro-1,3,5-triazine, 1,3,5-trimethacryloxylhexahydro-1,3,5-triazine; pentaerythritol tetraacrylate, pentaerythritol tetramethacrylate, di(trimethyloylpropane) tetraacrylate, di(trimethyloyl-propane) tetramethacrylate, allyl methacrylate, allyl acrylate, divinylbenzene, 2-methyl-1,4-divinylbenzene, bis(4-vinylphenyl) methane, 1,2-bis(4-vinylphenyl)ethane, etc.), triallyl isocyanurate, 2,4,6-triallyloxy-1,3,5-triazine, 1,2,4-trivinylcyclohexane, or mixtures thereof.

13. The method of any one of embodiments 1 to 7, wherein the insert-forming composition is a polymerizable composition for forming an insert having an oxygen permeability of from about 40 barrers to 200 barrers and a refractive index of from about 1.47 to about 1.8, and comprises at least one aryl-containing polysiloxane vinylic crosslinker and optionally at least one components selected from the group consisting of a non-silicone aryl vinylic monomer, a silicone-containing aryl vinylic monomer, a non-silicone aryl vinylic crosslinker, and combinations thereof.

14. The method of embodiment 13, wherein said at least one aryl-containing polysiloxane vinylic crosslinker each comprises (1) a polydiorganosiloxane segment comprising dimethylsiloxane units and aryl-containing siloxane units each having at least one aryl-containing substituent having up to 45 carbon atoms; and (2) ethylenically-unsaturated groups (preferably (meth) acryloyl groups).

15. The method of embodiment 14, wherein said at least one aryl-containing polysiloxane vinylic crosslinker comprises a vinyl terminated polyphenylmethysiloxane, a vinylphenylmethyl terminated phenylmethyl-vinylphenylsiloxane copolymer, a vinyl terminated diphenylsiloxane-dimethylsiloxane copolymer, a (meth)acryloxyalkyl-terminated polyphenylmethysiloxane, a (meth)acryloxyalkyl-terminated phenylmethyl-vinylphenylsiloxane copolymer, a (meth)acryloxyalkyl-terminated diphenylsiloxane-dimethylsiloxane copolymer, an ethylenically-unsaturated group-terminated dimethylsiloxane-arylmethylsiloxane copolymer, or combinations thereof.

16. The method of any one of embodiments 13 to 15, wherein the insert-forming composition comprises at least one silicone-containing aryl vinylic monomer, preferably selected from the group consisting of p-vinylphenyltris(trimethylsiloxy)silane, m-vinylphenyltris (trimethylsiloxy)silane, o-vinylphenyltris(trimethylsiloxy)silane, p-styrylethyltris(trimethylsiloxy)silane, m-styrylethyl-tris(trimethylsiloxy)silane, o-styrylethyl-tris(trimethylsiloxy)silane, and combinations thereof.

17. The method of any one of embodiments 1 to 16, wherein the lens-forming composition is either (1) a monomer mixture comprising (a) at least one hydrophilic vinylic monomer which is a hydroxyl-containing vinylic monomer, a N-vinyl amide monomer, a (meth) acrylamido monomer, or combinations thereof, (b) a vinylic crosslinker, and (c) at least one component selected from the group consisting of a hydrophobic vinylic monomer, a free-radical initiator (photoinitiator or thermal initiator), a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a vinylic crosslinker, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent, and combinations thereof.

18. The method of any one of embodiments 1 to 16, wherein the lens-forming composition comprises at least 50% by mole of at least one hydroxyl-containing vinylic monomer.

19. The method of embodiment 18, wherein said at least one hydroxyl-containing vinylic monomer is selected from the group consisting of hydroxyethyl (meth)acrylate, glycerol (meth)acrylate, 3-hydroxypropyl (meth) acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and mixtures thereof.

20. The method of any one of embodiments 1 to 16, wherein the lens-forming composition comprises (1) at least one siloxane-containing (or silicone-containing) vinylic monomer and/or at least one polysiloxane vinylic crosslinker and (2) at least one hydrophilic vinylic monomer.

21. The method of embodiment 20, wherein the lens-forming composition comprises at least one siloxane-containing vinylic monomer which is a vinylic monomer having a bis(trimethylsilyloxy)alkylsilyl group or a tris(trimethylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, trimethylsilylmethyl vinyl carbonate, or a combination thereof.

22. The method of embodiment 20, wherein the lens-forming composition comprises tris(trimethylsilyloxy)-silylpropyl (meth)acrylate, [3-(meth)acryloxy-2-hydroxypropyloxy]-propyl-bis(trimethylsiloxy)-methylsilane, [3-(meth)acryloxy-2-hydroxypropyloxy] propyl-bis(trimethylsiloxy)butylsilane, 3-(meth) acryloxy-2-(2-hydroxyethoxy)-propyloxy)-propylbis (trimethylsiloxy)methylsilane, 3-(meth)acryloxy-2-hydroxypropyloxy)propyl-tris(trimethylsiloxy)silane, N-[tris(trimethylsiloxy)-silylpropyl]-(meth)acrylamide, N-(2-hydroxy-3-(3-(bis(trimethylsilyloxy)methylsilyl)propyloxy)-propyl)-2-methyl (meth)acrylamide, N-(2-hydroxy-3-(3-(bis(trimethylsilyloxy)methylsilyl)-propyloxy)propyl) (meth)acrylamide, N-(2-hydroxy-3-(3-(tris(trimethylsilyloxy)silyl)propyloxy)-propyl)-2-methyl acrylamide, N-(2-hydroxy-3-(3-(tris (trimethylsilyloxy)silyl)propyloxy)propyl) (meth) acrylamide, N-[tris(dimethylpropylsiloxy)-silylpropyl]-(meth)acrylamide, N-[tris (dimethylphenylsiloxy)silylpropyl] (meth)acrylamide, N-[tris(dimethylethylsiloxy)-silylpropyl] (meth)acrylamide, N,N-bis[2-hydroxy-3-(3-(bis(trimethyl-silyloxy)methylsilyl)-propyloxy)propyl]-2-methyl (meth) acrylamide, N,N-bis[2-hydroxy-3-(3-(bis (trimethylsilyloxy)methylsilyl)propyloxy)-propyl] (meth)acrylamide, N,N-bis[2-hydroxy-3-(3-(tris(trimethylsilyloxy)silyl)propyloxy)propyl]-2-methyl (meth) acrylamide, N,N-bis[2-hydroxy-3-(3-(tris(trimethylsilyloxy)silyl)propyloxy)propyl] (meth)acrylamide, N-[2-hydroxy-3-(3-(t-butyl-dimethylsilyl)propyloxy) propyl]-2-methyl (meth)acrylamide, N-[2-hydroxy-3-(3-(t-butyldimethyl-silyl)propyloxy)propyl] (meth) acrylamide, N,N-bis[2-hydroxy-3-(3-(t-butyldimethylsilyl)propyloxy)-propyl]-2-methyl (meth)acrylamide, N-2-(meth)acryloxyethyl-O-(methyl-bis-trimethylsiloxy-3-propyl)silyl carbamate, 3-(trimethylsilyl)propylvinyl carbonate, 3-(vinyloxycarbonylthio)propyl-tris(trimethylsiloxy)silane, 3-[tris (trimethylsiloxy)-silyl]propylvinyl carbamate, 3-[tris (trimethyl-siloxy)silyl] propyl allyl carbamate, 3-[tris (trimethylsiloxy)silyl]propyl vinyl carbonate, or a combination thereof.

23. The method of any one of embodiments 20 to 22, wherein the lens-forming composition comprises α-(meth)acryloxypropyl terminated ω-butyl (or ω-methyl) terminated polydimethylsiloxane, α-(meth) acryloxy-2-hydroxypropyloxypropyl terminated ω-butyl (or ω-methyl) terminated polydimethylsiloxane, α-(2-hydroxyl-methacryloxypropyloxypropyl)-ω-butyl-decamethylpentasiloxane, α-[3-(meth) acryloxyethoxy-2-hydroxypropyloxypropyl]-terminated ω-butyl (or ω-methyl) terminated polydimethylsiloxane, α-[3-(meth)acryloxy-propyloxy-2-hydroxypropyloxypropyl]-terminated ω-butyl (or ω-methyl) terminated polydimethylsiloxane, α-[3-(meth)acryloxyisopropyloxy-2-hydroxypropyloxypropyl]-terminated ω-butyl (or ω-methyl) terminated polydimethylsiloxane, α-[3-(meth)acryloxy-butyloxy-2-hydroxypropyloxypropyl]-terminated ω-butyl (or ω-methyl) terminated polydimethylsiloxane, α-[3-(meth)acryloxy-ethylamino-2-hydroxypropyloxypropyl]-terminated ω-butyl (or ω-methyl) terminated polydimethylsiloxane, α-[3-(meth)acryloxy-propylamino-2-hydroxypropyloxypropyl]-terminated ω-butyl (or ω-methyl) terminated polydimethylsiloxane, α-[3-(meth)acryloxy-butylamino-2-hydroxypropyloxypropyl]-terminated ω-butyl (or ω-methyl) terminated polydimethylsiloxane, α-(meth)acryloxy-(polyethylenoxy)-2-hydroxypropyloxypropyl]-terminated ω-butyl (or ω-methyl) terminated polydimethylsiloxane, α-[(meth)acryloxy-2-hydroxypropyloxy-ethoxypropyl]-terminated ω-butyl (or ω-methyl) terminated polydimethylsiloxane, α-[(meth)acryloxy-2-hydroxypropyl-N-ethylaminopropyl]-terminated ω-butyl (or ω-methyl) terminated polydimethylsiloxane, α-[(meth)acryloxy-2-hydroxypropyl-amino-propyl]-terminated ω-butyl (or ω-methyl) terminated polydimethylsiloxane, α-[(meth)acryloxy-2-hydroxy-propyloxy-(polyethylenoxy)-propyl]-terminated ω-butyl (or ω-methyl) terminated polydimethylsiloxane, α-(meth)acryloylamidopropyloxypropyl terminated ω-butyl (or ω-methyl) terminated polydimethylsiloxane, α-N-methyl-(meth) acryloylamidopropyloxypropyl terminated ω-butyl (or ω-methyl) terminated polydimethylsiloxane, α-[3-(meth)acrylamidoethoxy-2-hydroxypropyloxy-propyl]-terminated ω-butyl (or ω-methyl) polydimethylsiloxane, α-[3-(meth)acrylamido-propyloxy-2-hydroxypropyloxypropyl]-terminated ω-butyl (or ω-methyl) terminated polydimethylsiloxane, α-[3-(meth)acrylamidoisopropyloxy-2-hydroxypropyloxy-propyl]-terminated ω-butyl (or ω-methyl) terminated polydimethylsiloxane, α-[3-(meth)acrylamido-butyloxy-2-hydroxypropyloxypropyl]-terminated ω-butyl (or ω-methyl) terminated polydimethylsiloxane, α-[3-(meth)acryloylamido-2-hydroxypropyloxypropyl] terminated ω-butyl (or ω-methyl) polydimethylsiloxane, α-[3-[N-methyl(meth)acrylamido]-2-hydroxypropyloxy-propyl] terminated ω-butyl (or ω-methyl) terminated polydimethylsiloxane, N-methyl-N'-(propyltetra (dimethylsiloxy)dimethylbutylsilane) (meth) acrylamide, N-(2,3-dihydroxypropane)-N'-(propyltetra (dimethylsiloxy)dimethylbutyl-silane) (meth) acrylamide, (meth)acryloylamido-propyltetra (dimethylsiloxy)dimethylbutyl-silane, mono-vinyl carbonate-terminated mono-alkyl-terminated polydimethylsiloxanes, mono-vinyl carbamate-terminated mono-alkyl-terminated polydimethylsiloxane, or a combination thereof.

24. The method of any one of embodiments 20 to 23, wherein the lens-forming composition comprises α,ω-(meth)acryloxy-terminated polydimethylsiloxanes of various molecular weight; α,ω-(meth)acrylamido-terminated polydimethylsiloxanes of various molecular weight; α,ω-vinyl carbonate-terminated polydimethylsiloxanes of various molecular weight; α,ω-vinyl carbamate-terminated polydimethylsiloxane of various molecular weight; bis-3-methacryloxy-2-hydroxypropyloxypropyl polydimethylsiloxane of various molecular weight; N,N,N',N'-tetrakis(3-methacryloxy-2-hydroxypropyl)-alpha,omega-bis-3-aminopropyl-polydimethylsiloxane of various molecular weight; the reaction products of glycidyl methacrylate or (meth) acryloyl chloride with di-amino-terminated polydimethylsiloxanes or di-hydroxyl-terminated polydimethylsiloxanes; the reaction products of an azlactone-containing vinylic monomer with di-hydroxyl-terminated polydimethylsiloxanes; the reaction products of isocyantoethyl (meth)acrylate with di-hydroxyl-terminated polydimethylsiloxanes; the reaction products of isocyantoethyl (meth)acrylate with di-amino-terminated polydimethylsiloxanes; the reaction product of an amino-containing acrylic monomer with di-carboxyl-terminated polydimethylsiloxane in the presence of a carbodiimide; the reaction product of a carboxyl-containing acrylic monomer with di-amino-terminated polydimethylsiloxane in the presence of a carbodiimide; the reaction product of a hydroxyl-containing acrylic monomer with a di-hydroxy-terminated polydisiloxane in the presence of a diisocyanate or di-epoxy coupling agent; or combinations thereof.

25. The method of any one of embodiments 20 to 24, wherein the lens-forming composition comprises α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxy-propyl]-terminated polydimethylsiloxane, α,ω-bis[3-(meth)acryloxybutyloxy-2-hydroxypropyloxy-propyl]-terminated polydimethylsiloxane, α,ω-bis[3-(meth)acrylamidoethoxy-2-hydroxypropyloxy-propyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethyl-siloxane, α,ω-bis[3-(meth)acryloxybutylamino-2-hydroxypropyloxypropyl]-terminated polydimethylsiloxane, α,ω-bis[(meth)acrylamido-ethylamino-2-hydroxypropyloxy-propyl]-terminated polydimethylsiloxane, α,ω-bis[3-(meth)acrylamidopropylamino-2-hydroxypropyloxy-propyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

26. The method of any one of embodiments 20 to 25, wherein the lens-forming composition comprises at least one chain-extended polysiloxane vinylic crosslinker having at least two polysiloxane segments.

27. The method of any one of embodiments 20 to 26, wherein the lens-forming composition comprises at least one hydrophilized polysiloxane vinylic crosslinker that is a di-(meth)acryloyloxy-terminated polysiloxane vinylic crosslinker having dimethylsiloxane units and hydrophilized siloxane units each having one methyl substituent and one monovalent $C_4$-$C_{40}$ organic radical substituent having 2 to 6 hydroxyl groups.

28. The method of any one of embodiments 20 to 27, wherein the lens-forming composition comprises at least one hydrophilic vinylic monomer that is: (1) an alkyl (meth)acrylamide selected from the group consisting of (meth)acrylamide, N,N-dimethyl (meth)acrylamide, N-ethyl (meth)acrylamide, N,N-diethyl (meth) acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris (hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth) acrylic acid, ethylacrylic acid, 3-(emth) acrylamidopropionic acid, 5-(meth) acrylamidopentanoic acid, 4-(meth) acrylamidobutanoic acid, 3-(meth)acrylamido-2-methylbutanoic acid, 3-(meth)acrylamido-3-methylbutanoic acid, 2-(emth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth) acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri (ethylene glycol) methyl ether (meth)acrylate, tetra (ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra (ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra (ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth) acryloylamino]propyl-2'-(trimethylammonio) ethylphosphate, 4-[(meth)acryloylamino]butyl-2'-(trimethylamrnonio)ethylphosphate, 5-((meth) acryloyloxy)-pentyl-2'-(trimethylammonio)ethyl phosphate, 6-((meth)acryloyloxy)hexyl-2-(trimethylammonio)ethylphosphate, 2-((meth)acryloyloxy)ethyl-2'-(triethylammonio)ethyl-phosphate, 2-((meth)acryloyloxy)ethyl-2-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy) butyl-2'-(trimethylammonio)-ethylphosphate, 2-((meth)acryloyloxy)pentyl-2'-(trimethylammonio) ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylamrnonio)ethylphosphate, 2-(vinyloxycarbonyl)ethyl-2'-(trimethylammonio) ethyl phosphate, 2-(allyloxycarbonyl)ethyl-2'-(trimethylammonio)-ethylphosphate, 2-(vinylcarbonylamino) ethyl-2'-(trimethylammonio)-ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12)N-2-hydroxyethyl vinyl carbamate; (13)N-carboxyvinyl-R-alanine (VINAL); (14)N-carboxyvinyl-α-alanine; (15) or combinations thereof.

29. The method of any one of embodiments 20 to 28, wherein the lens-forming composition comprises at least one at least one non-silicone vinylic crossling agent that is ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth) acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1, 3-diyl)] di-(meth)acrylate, bis[2-(meth)acryloxyethyl] phosphate, trimethylolpropane di-(meth)acrylate, and 3,4-bis[(meth)acryloyl]tetrahydrofuran, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis (meth)acrylamide, N,N'-dihydroxyethylene bis(meth) acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis (meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

30. The method of any one of embodiments 20 to 29, wherein the lens-forming composition comprises at least one blending vinylic monomer, at least one UV-absorbing vinylic monomer, at least one UV/HEVL-absorbing vinylic monomer, at least one photochromic vinylic monomer, at least one polymerizable dye, or combinations thereof.

31. The method of any one of embodiments 20 to 30, wherein the lens-forming composition comprises N-vinylpyrrolidone, N-vinyl-N-methyl acetamide, or combinations thereof.

32. The method of any one of embodiments 20 to 31, wherein the lens-forming composition comprises N,N-dimethyl (meth)acrylamide.

33. The method of any one of embodiments 20 to 32, wherein the lens-forming composition comprises N-2-hydroxylethyl (meth)acrylamide, N,N-bis(hydroxyethyl) (meth)acrylamide, N-3-hydroxypropyl (meth) acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol)

(meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

34. An embedded hydrogel contact lens produced according to the method of any one of embodiments 1 to 33.

35. An embedded hydrogel contact lens of embodiment 34 where the insert comprises a diffractive optical element.

All the publications, patents, and patent application publications, which have been cited herein above in this application, are hereby incorporated by reference in their entireties.

What is claimed is:

1. A method for producing embedded hydrogel contact lenses, comprising the steps of:

(1) obtaining an female insert mold half having a first molding surface, an male insert mold half having a second molding surface, a female lens mold half having a third molding surface, and a male lens mold half having a fourth molding surface, wherein the first and second molding surfaces defines respectively the front and back surfaces of a to-be-molded insert, wherein the third and fourth molding surfaces defines respectively the anterior and posterior surfaces of a to be-molded contact lens, wherein the female and male insert mold halves are configured to receive each other such that an insert molding cavity is formed between the first and second molding surfaces when the female and male insert mold halves are closed securely, wherein the female and male lens mold halves are configured to receive each other such that a lens molding cavity is formed between the third and fourth molding surfaces when the female and male lens mold halves are closed securely, wherein the male lens mold and the female insert mold are configured to mate in a nested fashion with a close or interference fit;

(2) dispensing an amount of an insert-forming composition on the first molding surface of the female insert mold half;

(3) placing the male insert mold half on top of the insert-forming composition in the female insert mold half and closing the male and female insert mold halves to form a first molding assembly comprising the insert-forming composition therein;

(4) curing the insert-forming composition in the first molding assembly to form the molded insert;

(5) separating the first molding assembly obtained in step (4) into the male insert mold half and the female insert mold half with the molded insert adhered onto the first molding surface;

(6) dosing a first amount of a lens-forming composition in the center of the back surface of the molded insert adhered on the first molding surface of the female insert mold half, wherein the first amount is sufficient to cover the back surface of the insert;

(7) placing the male lens mold half on top of the lens-forming composition and closing the male lens mold half and the female insert mold half to form a second molding assembly in which the lens-forming composition is located in a gap between the back surface of the insert and the fourth molding surface of the male lens mold half;

(8) actinically irradiating the lens-forming composition in specific locations in the second molding assembly so as to form spots of adhesion of the molded insert to the fourth molding surface of the male lens mold half;

(9) removing the female insert mold half, leaving the molded insert adhered onto the fourth molding surface of the male lens mold half;

(10) dispensing a second amount of the lens-forming composition on the third molding surface of the female lens mold half;

(11) placing the male lens mold half with the molded insert adhered thereon and obtained in step (9) on top of the female lens mold half and closing the male and female lens mold halves to form a third molding assembly comprising the lens-forming composition and the insert adhered onto the male lens mold half and suspended in the lens-forming composition;

(12) actinically curing the lens-forming composition in the third molding assembly to form an embedded hydrogel contact lens precursor that comprises the molded insert embedded within a hydrogel material formed from the lens-forming composition;

(13) separating the third molding assembly obtained in step (12) into the male and female lens mold halves, with the embedded hydrogel contact lens precursor adhered on one of the male and female lens mold halves;

(14) removing the embedded hydrogel contact lens precursor from the lens-adhered mold half; and

(15) subjecting the embedded hydrogel contact lens precursor to post-molding processes including a hydration process and one or more other processes selected from the group consisting of extraction, surface treatment, packaging, sterilization, and combinations thereof to form an embedded hydrogel contact lens.

2. The method of claim 1, wherein the step of (4) curing the insert-forming composition is carried out photochemically by using UV and/or visible light.

3. The method of claim 1, wherein the step of (4) curing the insert-forming composition is carried out thermally by heating the first molding assembly in an oven at one or more curing temperatures selected from about 40° C. to about 100° C.

4. The method of claim 1, wherein the male insert mold half comprises an overflow groove which surrounds the second molding surface and into which any excess insert-forming material is pressed when the first molding assembly is closed securely, wherein any flushes formed from the excess insert-forming material during step (4) can be stuck on the male insert mold half during step of separating the first molding assembly halves, thereby removing the flushes.

5. The method of claim 4, wherein the step (8) is carried out by using a mask with holes that allows actinic irradiation passing through to generate the actinically exposed locations in the gap, thereby forming spots of adhesion between the molded insert to the fourth molding surface of the male lens mold half.

6. The method of claim 5, wherein the holes are arranged in a rotationally symmetric manner.

7. The method of claim 4, wherein the insert-forming composition is a polymerizable composition comprising at least one polymerizable photochromic compound, at least UV-absorbing vinylic monomer, at least one HEVL-absorbing vinylic monomer, a fluorescent vinylic monomer, at least one color-filtering material for correcting color blindness, a diffractive material, a high refractive-index material, or combinations thereof.

8. The method of claim 7, wherein the insert-forming composition is a polymerizable composition that comprises at least about 55% by mole of one or more acrylic monomers and/or one or more acrylic crosslinker or crosslinking agent and at least about 6% by mole of at least one vinylic crosslinking agent.

9. The method of claim 7, wherein the insert-forming composition is a polymerizable composition for forming an insert having an oxygen permeability of from about 40 barrers to 200 barrers and a refractive index of from about 1.47 to about 1.8, and comprises at least one aryl-containing polysiloxane vinylic crosslinker and optionally at least one components selected from the group consisting of a non-silicone aryl vinylic monomer, a silicone-containing aryl vinylic monomer, a non-silicone aryl vinylic crosslinker, and combinations thereof.

10. The method of claim 9, wherein said at least one aryl-containing polysiloxane vinylic crosslinker each comprises (1) a polydiorganosiloxane segment comprising dimethylsiloxane units and aryl-containing siloxane units each having at least one aryl-containing substituent having up to 45 carbon atoms; and (2) ethylenically-unsaturated groups.

11. The method of claim 10, wherein said at least one aryl-containing polysiloxane vinylic crosslinker comprises a vinyl terminated polyphenylmethysiloxane, a vinylphenylmethyl terminated phenylmethyl-vinylphenylsiloxane copolymer, a vinyl terminated diphenylsiloxane-dimethylsiloxane copolymer, a (meth) acryloxyalkyl-terminated polyphenylmethysiloxane, a (meth) acryloxyalkyl-terminated phenylmethyl-vinylphenylsiloxane copolymer, a (meth) acryloxyalkyl-terminated diphenylsiloxane-dimethylsiloxane copolymer, an ethylenically-unsaturated group-terminated dimethylsiloxane-arylmethylsiloxane copolymer, or combinations thereof.

12. The method of claim 10, wherein the insert-forming composition comprises at least one silicone-containing aryl vinylic monomer.

13. The method of claim 10, wherein the lens-forming composition is either (1) a monomer mixture comprising (a) at least one hydrophilic vinylic monomer which is a hydroxyl-containing vinylic monomer, a N-vinyl amide monomer, a (meth) acrylamido monomer, or combinations thereof, (b) a vinylic crosslinker, and (c) at least one component selected from the group consisting of a hydrophobic vinylic monomer, a free-radical initiator, a UV-absorbing vinylic monomer, a high-energy-violet-light ("HEVL") absorbing vinylic monomer, a visibility tinting agent, and combinations thereof; or (2) an aqueous solution comprising one or more water-soluble prepolymers and at least one component selected from the group consisting of hydrophilic vinylic monomer, a vinylic crosslinker, a hydrophobic vinylic monomer, a lubricating agent, a free-radical initiator, a UV-absorbing vinylic monomer, a HEVL absorbing vinylic monomer, a visibility tinting agent, and combinations thereof.

14. The method of claim 13, wherein the lens-forming composition comprises (1) at least one siloxane-containing vinylic monomer and/or at least one polysiloxane vinylic crosslinker and (2) at least one hydrophilic vinylic monomer.

15. The method of claim 14, wherein the lens-forming composition comprises: at least one at least one non-silicone vinylic crossling agent; at least one blending vinylic monomer, at least one UV-absorbing vinylic monomer, at least one UV/HEVL-absorbing vinylic monomer, at least one photochromic vinylic monomer, at least one polymerizable dye, or combinations thereof.

* * * * *